United States Patent
Wendlandt et al.

(10) Patent No.: US 7,482,613 B2
(45) Date of Patent: *Jan. 27, 2009

(54) MULTICASSETTE AUTOLOADER FOR A STORAGE PHOSPHOR READER

(75) Inventors: William C. Wendlandt, Rush, NY (US); Christopher J. Kralles, Rochester, NY (US); Michael Kenin, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/016,457

(22) Filed: Dec. 17, 2004

(65) Prior Publication Data

US 2006/0131527 A1   Jun. 22, 2006

(51) Int. Cl.
*B65H 5/00* (2006.01)
*G01N 23/04* (2006.01)

(52) U.S. Cl. ..................... 250/589; 250/584

(58) Field of Classification Search ............ 250/589, 250/590, 584; 378/172; 414/413, 403, 788.7, 414/798.7
See application file for complete search history.

(56) References Cited

U.S. PATENT DOCUMENTS

| | | | |
|---|---|---|---|
| 4,893,011 A | 1/1990 | Bauer et al. | 250/327.2 |
| 4,908,514 A | 3/1990 | Bauer et al. | |
| 5,340,995 A | 8/1994 | Verbeke et al. | |
| 5,493,128 A | 2/1996 | Boutet | 250/454 |
| 6,346,714 B1 | 2/2002 | Mueller et al. | |
| 6,437,359 B1 | 8/2002 | Hall et al. | 250/589 |
| 2004/0169152 A1* | 9/2004 | Tsutoh et al. | 250/589 |
| 2006/0131525 A1* | 6/2006 | Kralles et al. | 250/589 |
| 2006/0131526 A1* | 6/2006 | Wendlandt | 250/589 |

FOREIGN PATENT DOCUMENTS

| | | |
|---|---|---|
| EP | 0 698 813 | 2/1996 |
| EP | 1 104 892 | 6/2001 |
| JP | 2004-264586 | 9/2004 |

* cited by examiner

*Primary Examiner*—David P Porta
*Assistant Examiner*—Carolyn Igyarto

(57) ABSTRACT

A multicassette autoloader for vertically oriented storage phosphor cassettes includes a front, a back and opposite sides. The autoloader includes an input bin for receiving multiple vertically oriented storage phosphor cassettes stacked together in face-to-face contact, wherein the cassettes are oriented front-to-back with faces facing the autoloader sides, and wherein each of the cassettes contains a storage phosphor which is removable from the cassette; a storage phosphor read location at which a storage phosphor is removed from and replaced in a storage phosphor cassette positioned at the storage phosphor read location; and an output bin for receiving storage phosphor cassettes from the storage phosphor read location for subsequent removal. The input bin, the storage phosphor read location, and the output bin are configured in the autoloader such that the input bin and the output bin are side-by-side but spaced apart and the storage phosphor read location is positioned in a path between the input bin and the output bin.

8 Claims, 33 Drawing Sheets

MULTICASSETTE AUTOLOADER FOR A STORAGE PHOSPHOR READER

FIELD OF THE INVENTION

The invention relates generally to the field of computed radiography, and in particular to a multicassette autoloader for a storage phosphor reader. More specifically, the invention relates to a multicassette autoloader which receives multiple vertically oriented storage phosphor cassettes stacked in face-to-face contact in an input bin, transports the cassettes serially in a path from the input bin to a storage phosphor read location and then to an output bin.

BACKGROUND OF THE INVENTION

Conventional film/screen radiography uses radiographic films which are not reusable. Computed radiography solves this problem by using reusable storage phosphors that can be exposed, read out, erased and reused many times. In order to protect the storage phosphor from damage during use, it is contained in a cassette from which it is removed during the reading and erasing process. One type of storage phosphor reader receives cassettes, one at a time, oriented horizontally. The cassette containing an exposed storage phosphor is presented to the reader horizontally, the storage phosphor is removed from the cassette and moved along a horizontal path, where it is read and then erased before the storage phosphor is replaced in its cassette. The cassette is then removed and a new cassette manually presented to the reader. In order to increase storage phosphor reader throughput and to relieve the reader user of sequentially loading and unloading storage phosphor cassettes, a multi-cassette autoloader was developed (See: U.S. Pat. No. 5,324,957, issued Jun. 28, 1994, inventor Hejazi). The autoloader disclosed in the latter patent is a separate piece of equipment from the storage phosphor reader and utilizes cog belts to index a plurality of horizontally oriented cassettes to a read site where the storage phosphors are removed from the cassettes and transported into and out of the storage phosphor reader. Because the cog belts are designed to accept only one size of cassette, the largest, and because many sized cassettes are used in the medical imaging field, pallets are used to handle smaller sized cassettes.

Although the latter autoloader is useful and successful for its intended purposes, it has certain drawbacks. Because the autoloader is a separate piece of equipment, substantial floor space is required to accommodate both the reader and the autoloader. Moreover, the use of pallets requires additional manual operations for the operator and creates storage problems when the pallets are not being utilized. A more compact storage phosphor reader is disclosed in U.S. Pat. No. 6,437,359 B1, issued Aug. 20, 2002, inventors Hall et al. As disclosed in the latter patent, the storage phosphor reader receives a storage phosphor cassette in a vertical orientation, removes the storage phosphor from the cassette, transports the storage phosphor along a vertical path where it is read and erased and replaces the storage phosphor in the cassette. An autoloader for such a vertically oriented storage phosphor reader is disclosed in U.S. Pat. No. 5,493,128, issued Feb. 20, 1996, inventor Boutet. The disclosed autoloader is combined with the storage phosphor reader resulting in the need for less floor space for the combined equipment. Moreover, the vertical autoloader automatically handles storage phosphor cassettes of varying sizes without the use of pallets. The vertical autoloader includes a cassette loading station and a cassette unloading station separated by a read site where an exposed storage phosphor is removed from and replaced in the storage phosphor cassette for vertical processing by the storage phosphor reader. Each of the cassette loading and cassette unloading stations includes a plurality of cassette locating slots defined by movable rear and bottom separators and indexers. The operator must load each cassette individually into a loading slot before the next cassette can be loaded. Moreover, the cassette must be loaded with the face oriented 90 degrees from the direction of loading in order to position it correctly into a cassette location slot.

Another generally vertically oriented storage phosphor reader is disclosed in U.S. Pat. No. 4,893,011, issued Jan. 9, 1990, inventors Bauer et al. The disclosed apparatus occupies a large floor area and is not provided with an autoloader to handle multiple cassettes of varying sizes. Moreover, the storage phosphor is removed from the cassette at one location and replaced in the cassette at another location resulting in inefficiencies.

While such systems may have achieved certain degrees of success in their particular applications, there is a need to provide an autoloader for vertically oriented storage phosphor cassettes of varying sizes which is easy to use, which allows the operator to load multiple cassettes at a time without regard to size and which is easily accessible.

SUMMARY OF THE INVENTION

According to the present invention, there is provided a solution to the problems and a fulfillment of the needs discussed above.

According to an aspect of the present invention, there is provided a multicassette autoloader for vertically oriented storage phosphor cassettes, said autoloader having a front, back and opposite sides, said autoloader comprising:

an input bin for receiving multiple vertically oriented storage phosphor cassettes stacked together in face-to-face contact, wherein said cassettes are oriented front-to-back with faces facing said autoloader sides, and wherein each of said cassettes contains a storage phosphor which is removable form said cassette;

a storage phosphor read location at which a storage phosphor is removed from and replaced in a storage phosphor cassette positioned at said storage phosphor read location; and an output bin for receiving storage phosphor cassettes from said storage phosphor read location for subsequent removal;

wherein said input bin, said storage phosphor read location and said output bin are configured in said autoloader such that said input bin and said output bin are side-by-side but spaced apart and said storage phosphor read location is positioned in a path between said input bin and output bin.

According to another aspect of the invention, there is provided a multicassette autoloader for vertically oriented storage phosphor cassettes, said autoloader having a front, back, and opposite sides, comprising:

an input bin for receiving multiple vertically oriented storage phosphor cassettes stacked together in face-to-face contact; wherein said cassettes are oriented front-to-back with faces facing said autoloader sides, and wherein each of said cassettes contains a storage phosphor which is removable from said cassette;

a storage phosphor read location at which a storage phosphor is removed from and replaced in a storage phosphor cassette positioned at said storage phosphor read location;

an output bin for receiving storage phosphor cassettes from said storage phosphor read location for subsequent removal; wherein said input bin, said storage phosphor read location, and said output bin are configured inline; and an assembly for transporting a storage phosphor cassette from said input bin, to said storage phosphor read location, and then to said output bin for removal from said output bin.

According to still another aspect of the present invention, there is provided a multicassette autoloader for vertically oriented storage phosphor cassettes, said autoloader having a front, back, and opposite sides, comprising:

an input bin for receiving multiple vertically oriented storage phosphor cassettes stacked together in face-to-face contact; wherein said cassettes are oriented front-to-back with faces facing said autoloader sides and wherein each of said cassettes contains a storage phosphor which is removable from said cassette;

a storage phosphor read location at which a storage phosphor is removed from and replaced in a storage phosphor cassette positioned at said storage phosphor read location;

a storage phosphor cassette pre-read location, and a storage phosphor cassette post-read location located on either side of said storage phosphor read location;

an output bin for receiving read storage phosphor cassettes for subsequent removal;

wherein said input bin and said output bin are beside each other at the front of said autoloader and said storage phosphor read location, said storage phosphor cassette pre-read location, and said storage phosphor cassette post read location are beside each other towards the back of said autoloader and in line front-to-back with said input and output bins; and an assembly for transporting a storage phosphor cassette in a path from said input bin, to said pre-read location, to said read location, to said post-read location, and finally to said output bin for removal from said autoloader.

The invention has the following advantages:

1. An autoloader is provided for a storage phosphor reader which handles vertically oriented storage phosphor cassettes of varying sizes and which is located at the top of the reader, thus occupying the same footprint as the reader.

2. The autoloader is easy to use and easily accessible by an operator to load multiple cassettes at a time without regard to size and without the necessity of positioning individual cassettes in the autoloader.

3. The autoloader orientation allows for cassettes to be loaded into the input bin from either the front, diagonally, and/or the side of the machine, and also for cassettes to be removed from the output bin of the machine from the side, diagonally, and/or front, thus making it configurable for the end user's location.

BRIEF DESCRIPTION OF THE DRAWINGS

The foregoing and other features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
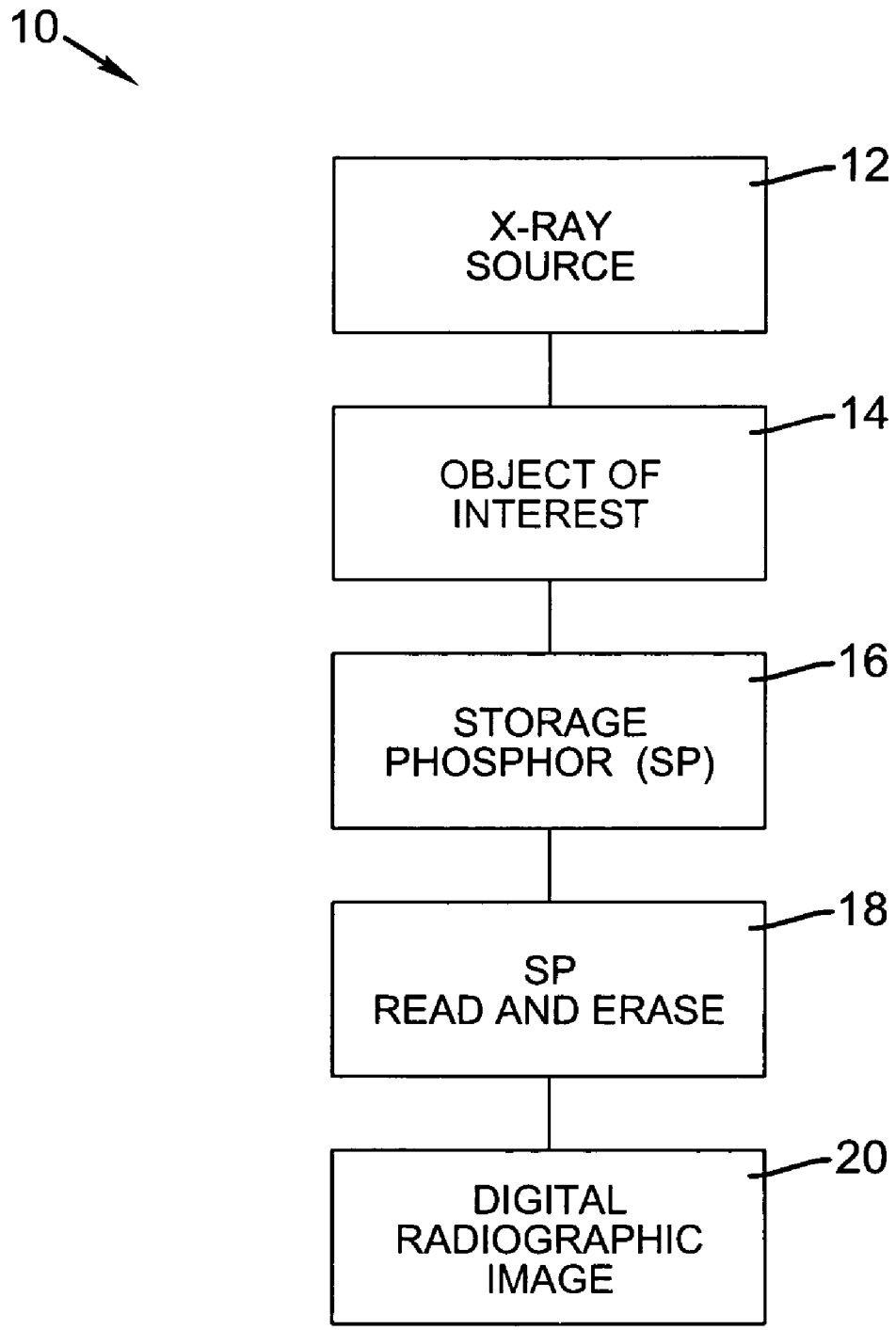
FIG. 1 is a block diagram showing a computed radiography system including the present invention.

The following is a detailed description of the preferred embodiments of the invention, reference being made to the drawings in which the same reference numerals identify the same elements of structure in each of the several figures.

The multicassette vertical autoloader of the present invention is used with a storage phosphor reader which is part of a computed radiography system. In general, computed radiography utilizes the principle that exposure of a storage phosphor to a radiographic image produces a corresponding latent image in the storage phosphor. If the storage phosphor is raster scanned (e.g., by means of a laser) in a storage phosphor reader with light of a first wavelength, the latent image will be emitted as a light image at a second wavelength. The emitted light image is converted into a digital image which can be processed, stored, displayed, and used to produce a hardcopy (film, paper) radiographic image.

FIG. 1 shows a generic computed radiography system 10 including the present invention. X-ray source 12 irradiates object of interest 14 (such as a body part) to produce a radiographic image which exposes storage phosphor (SP) 16. The latent radiographic image stored in storage phosphor 16 is read out in storage phosphor reader 18 as a digital radiographic image 20. The storage phosphor 16 is erased in SP reader 18 so that it can be reused. The digital radiographic image 20 can be processed to enhance the image, stored for later use, displayed on a display monitor for diagnostic purposes, transmitted to a remote location and/or used to produce a hard copy print (film or paper).

Figure 2:
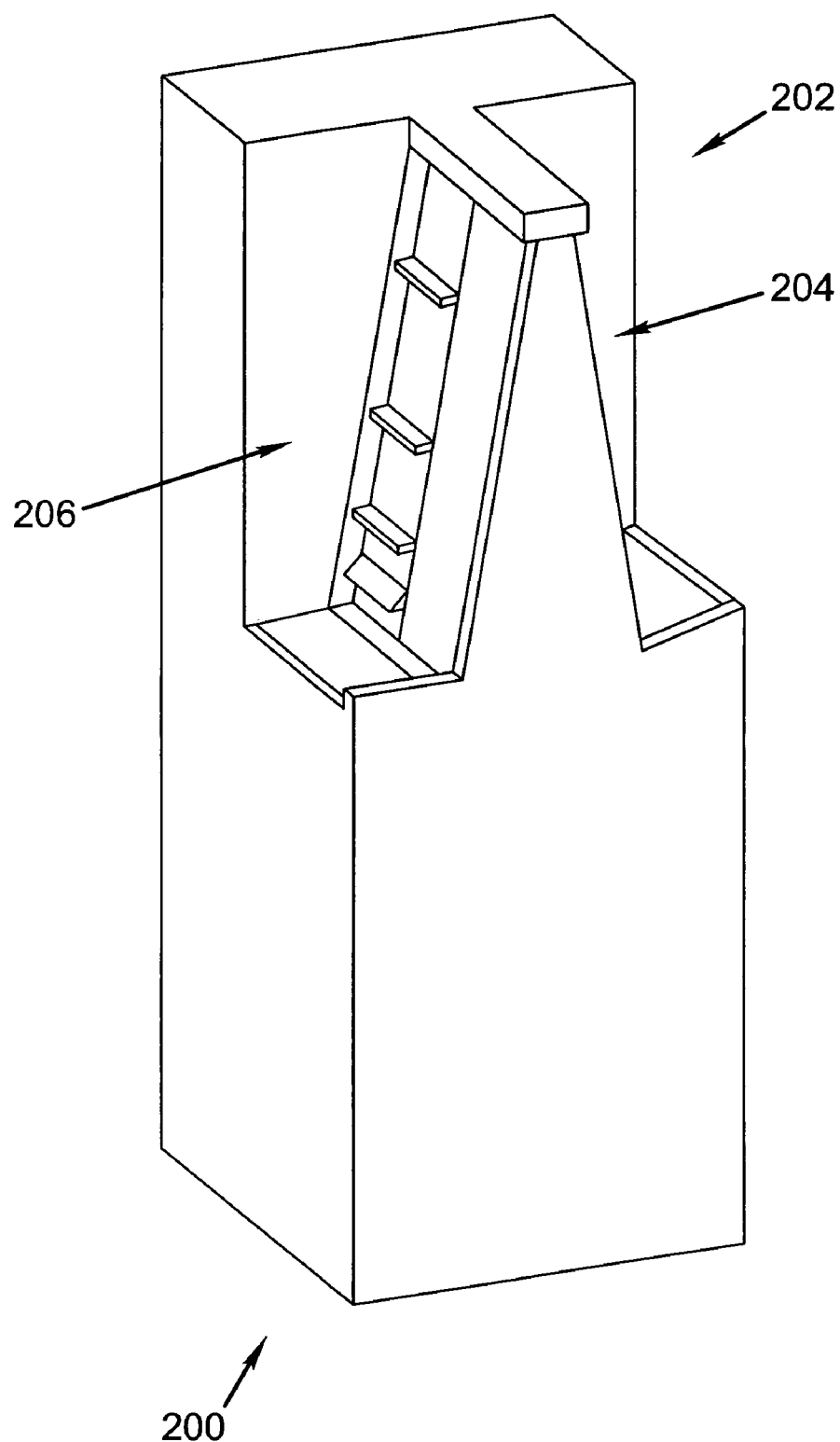
FIGS. 2 and 3 are respective left front and right front perspective views of a storage phosphor reader including an embodiment of the present invention.
Figure 3:
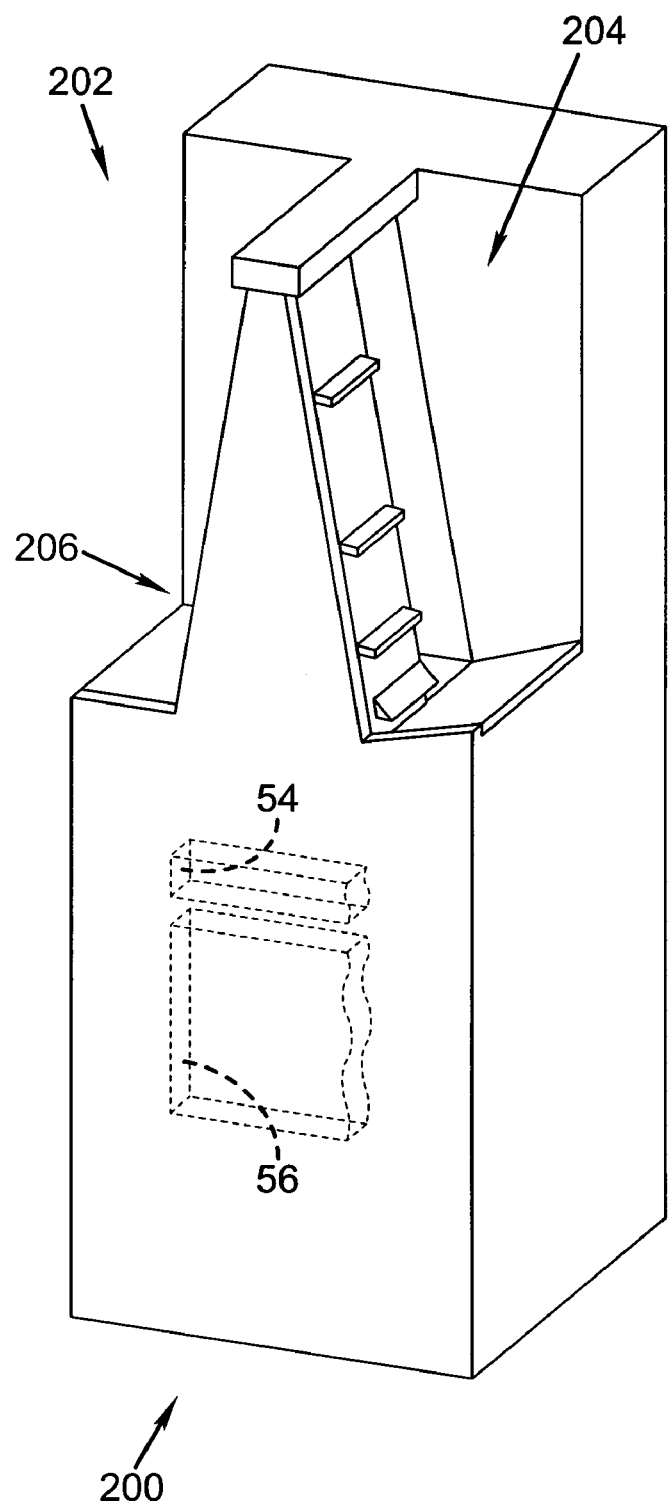

FIGS. 2 and 3 show storage phosphor reader 200 with read module 54 and erase module 56 (both shown in dotted lines in FIG. 3). Multicassette, vertical autoloader 202 is mounted on the top of reader 200, and includes input bin 204 and output bin 206.

Figure 4:
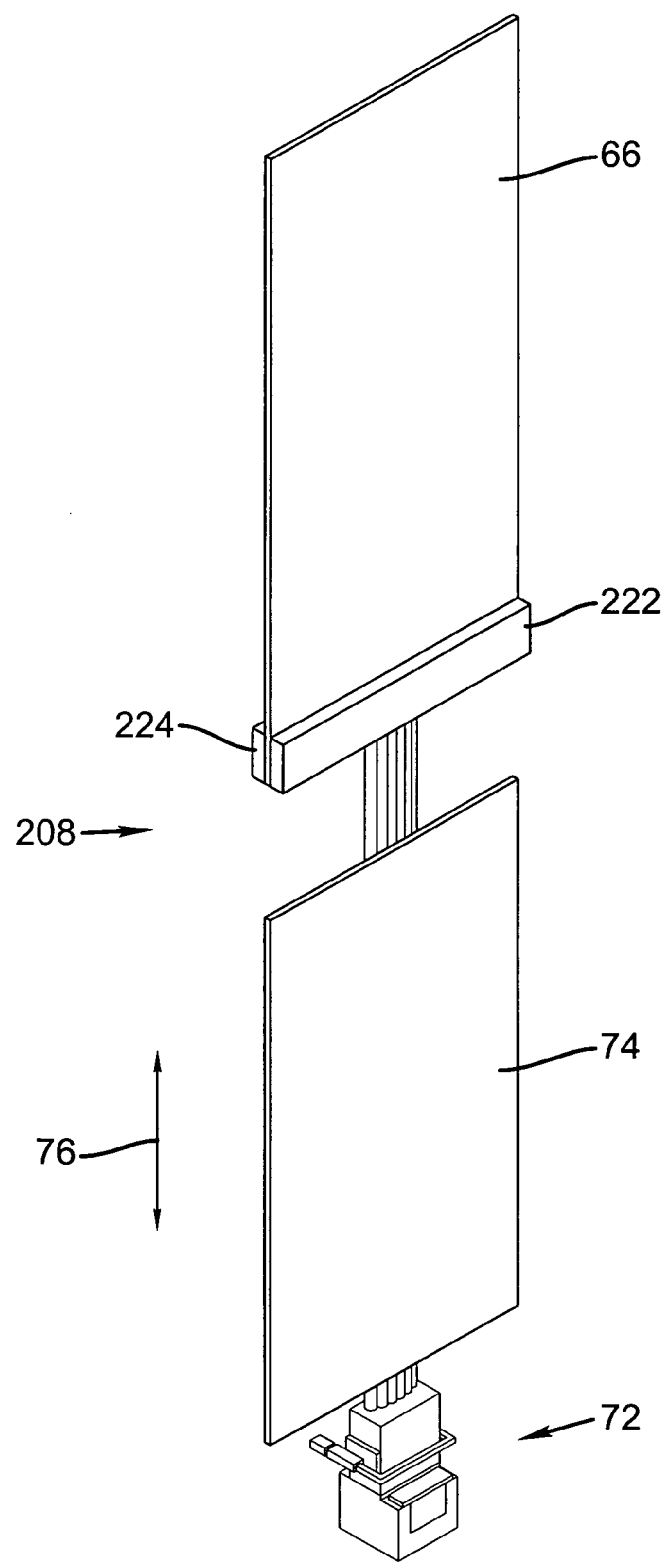
FIGS. 4 and 5 are respective front perspective and side elevational, diagrammatic views showing a vertical scanning assembly which can be incorporated in the storage phosphor reader including the present invention.
Figure 5:
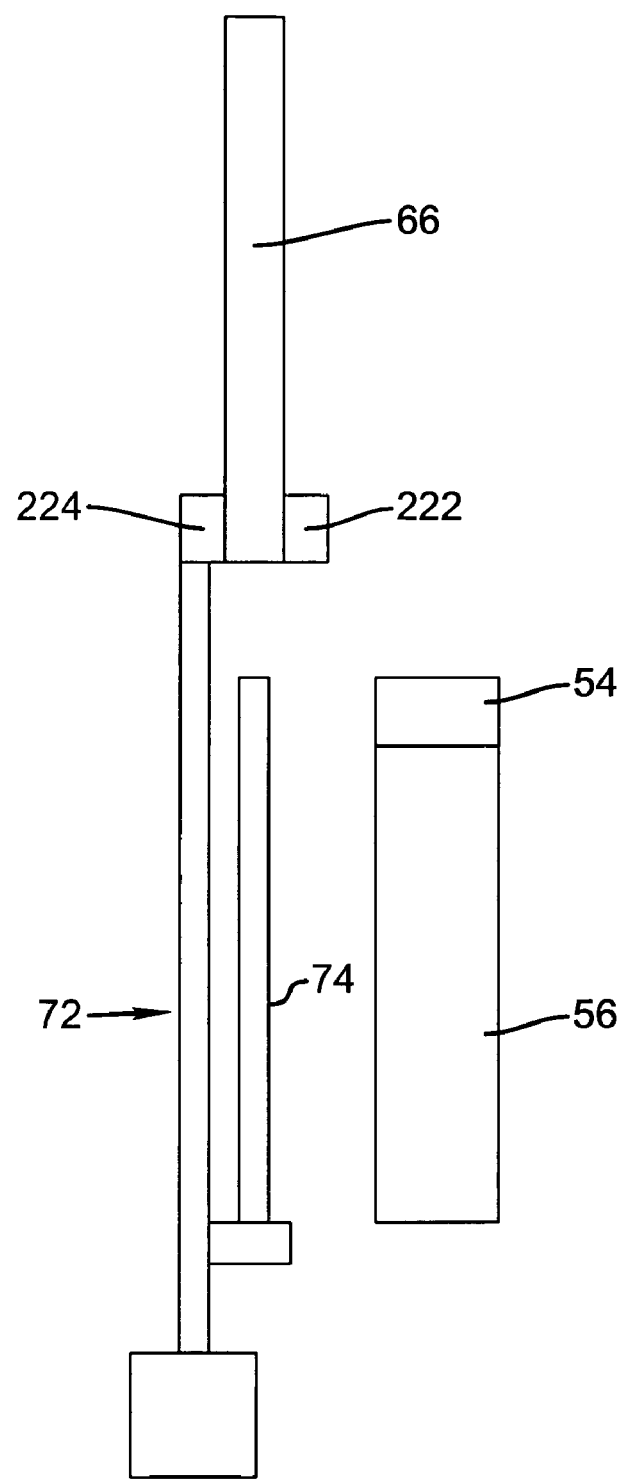

Referring now to FIGS. 4 and 5, there is shown an exemplary vertical assembly for transporting a storage phosphor 74 from cassette 66, past read and erase modules 54, 56 and then back to cassette 66 (The assembly described in greater detail in U.S. Pat. No. 6,437,359 B1, issued Aug. 20, 2002, inventors Hall et al. can be used or any other suitable assembly). As shown, storage phosphor cassette 66 is held at storage phosphor read location 208 of storage phosphor reader 200 by clamps 222 and 224. A storage phosphor transport assembly 72 removes storage phosphor 74 from cassette 66 and transports storage phosphor 74 vertically past read module 54 and erase module 56. Transport assembly 72 then transports storage phosphor 74 vertically to replace it in cassette 66. The vertical transport directions of storage phosphor 74 are represented by bidirectional arrow 76. This vertical transport assembly can be used with any of the embodiments of the invention.

Figure 6:
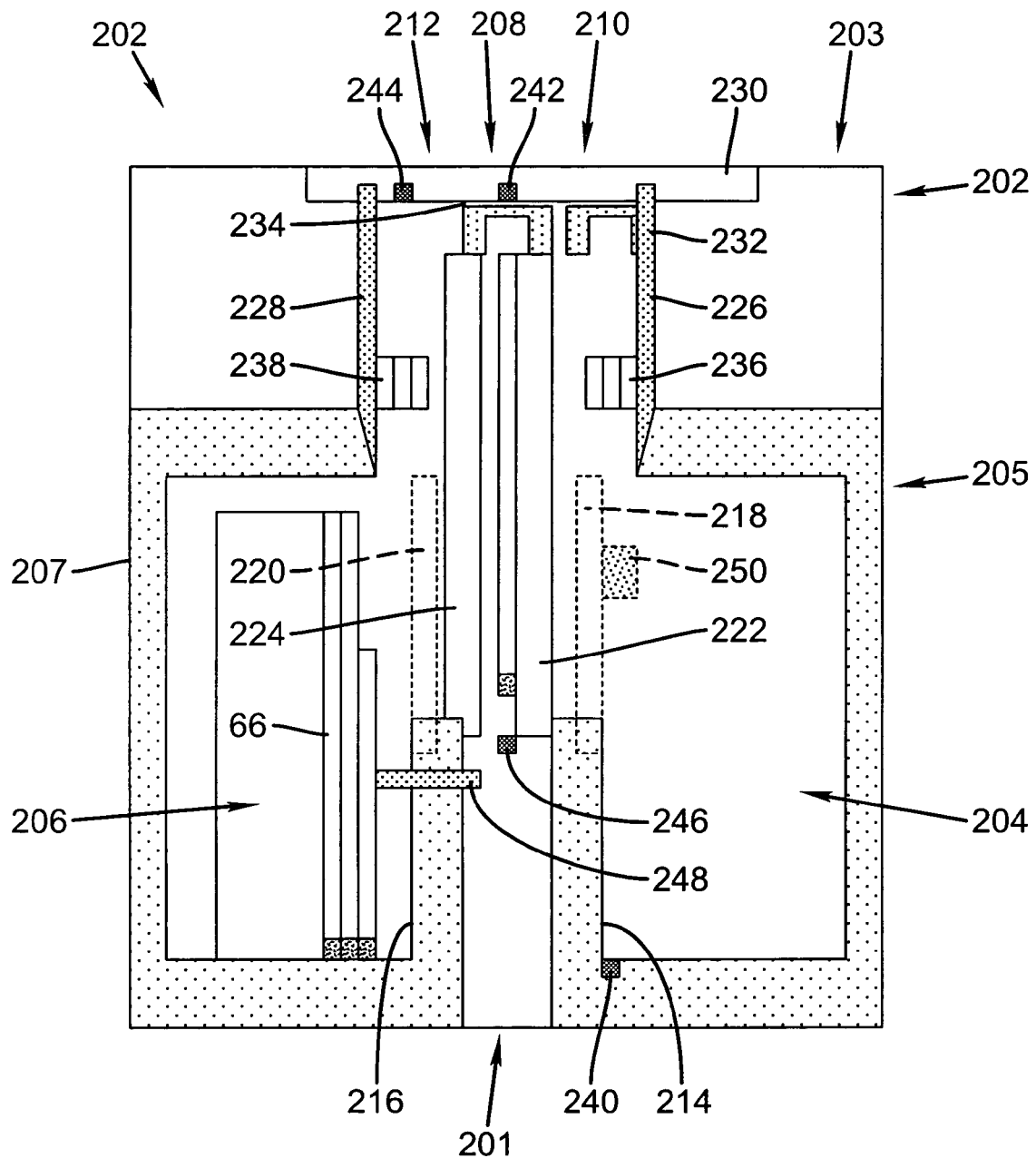
FIG. 6 is a top plan, diagrammatic view of the embodiment of the present invention shown in FIGS. 2 and 3.

FIG. 6 shows a top plan view of the autoloader 202 which includes input bin 204, output bin 206, storage phosphor read location 208, pre-read location 210, and post-read location 212 on either side of read location 208. Autoloader 202 also includes input and output fixed walls 214 and 216, input and output telescoping walls 218 and 220, fixed clamp 222, moving clamp 224, stack separators 226, 228, transport 230 with transport cups 232 and 234, loader 236, unloader 238, cassette stripper 240, ejectors 242 and 244, size changer/light curtain 246, output stack lifter mechanism 248, and barcode scanner 250. Autoloader 202 has a front 201, a back 203, and opposite sides 205 and 207. Input and output bins 204, 206 are side-by-side but spaced apart, and respective read, pre-read, and post-read locations 208, 210, and 212 are to the back of but overlapping said input and output bins 204, 206.

Figure 7:
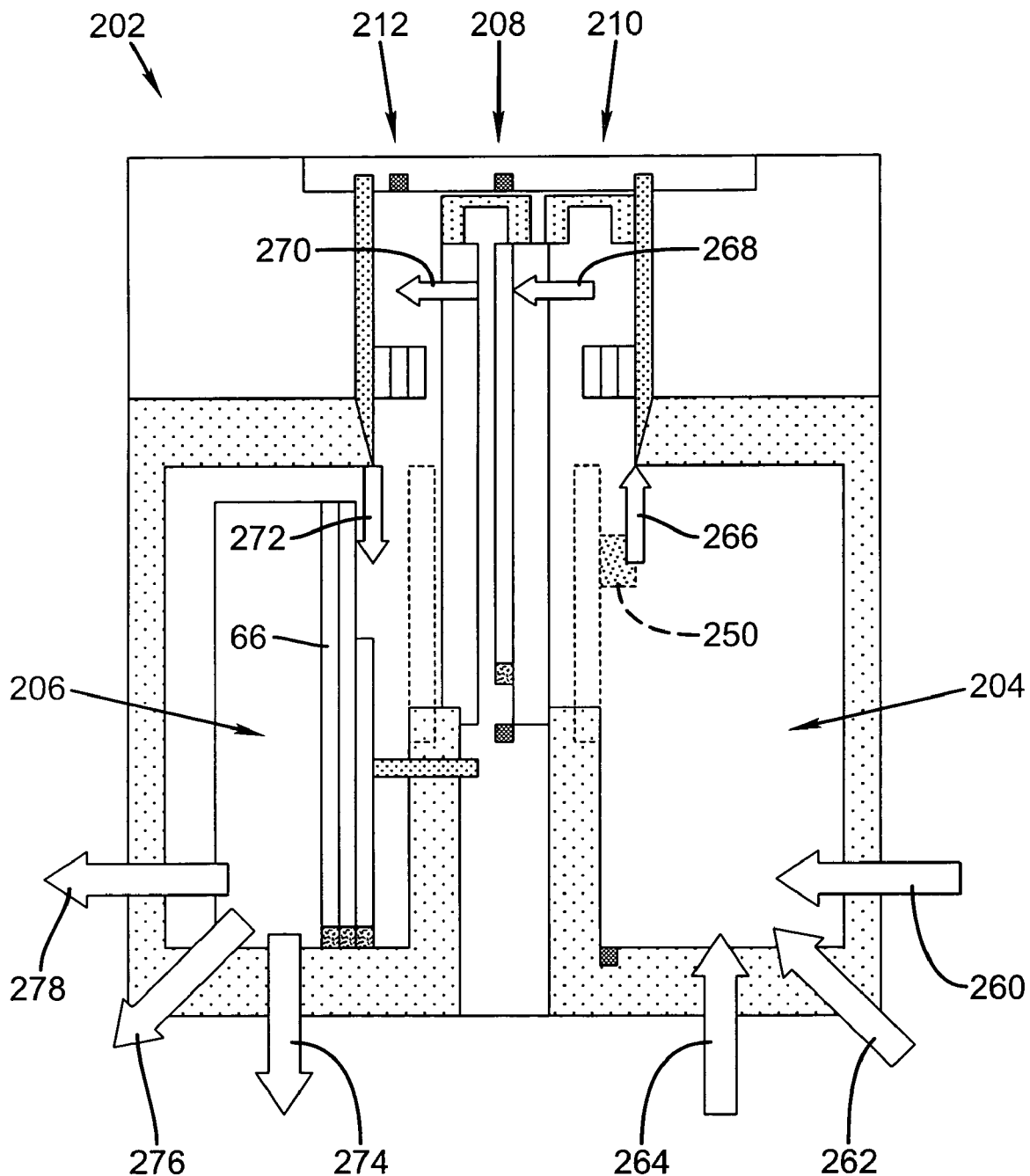
FIG. 7 is a top plan, diagrammatic view of the embodiment of FIG. 6 showing the storage phosphor cassette flow path.

FIG. 7 shows the transport path of cassette 66 into, through and out of autoloader 202. Cassettes 66 are loaded into input bin 204 from the side (arrow 260), diagonally (arrow 262), and/or from the front (arrow 264). The cassettes 66 are transported serially past bar code scanner 250 to pre-read location 210 (arrow 266), to read location 208 (arrow 268), to post-read location 212 (arrow 270), and finally to output bin 206 (arrow 272). The read and erased cassettes 66 can be removed from output bin 206 from the front (arrow 274), diagonally (arrow 276), and/or from the side (arrow 278).

Figure 8:
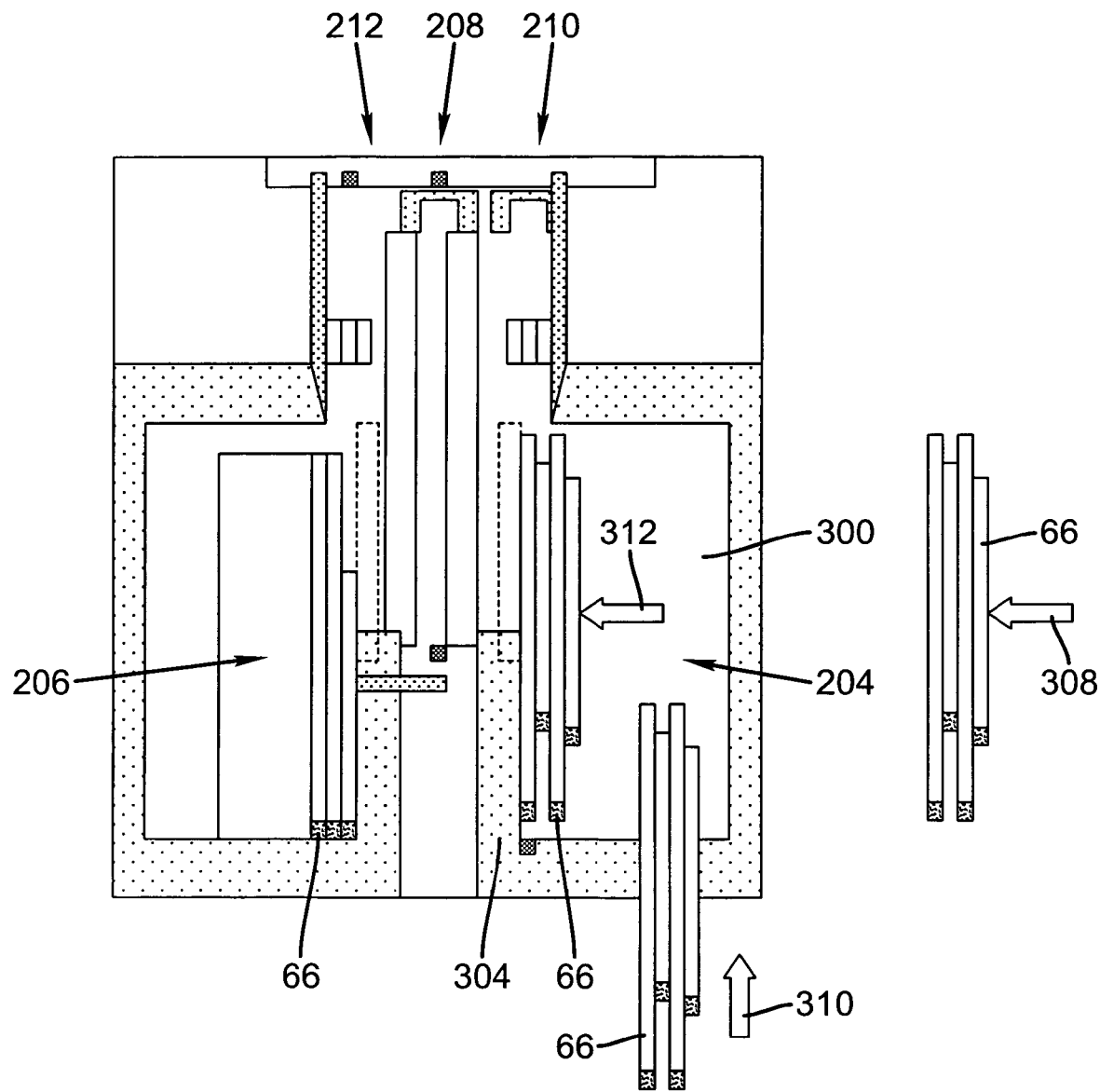
FIG. 8 is a top, plan diagrammatic view of the embodiment of FIG. 6 showing operator loading of the input bin.
Figure 9:
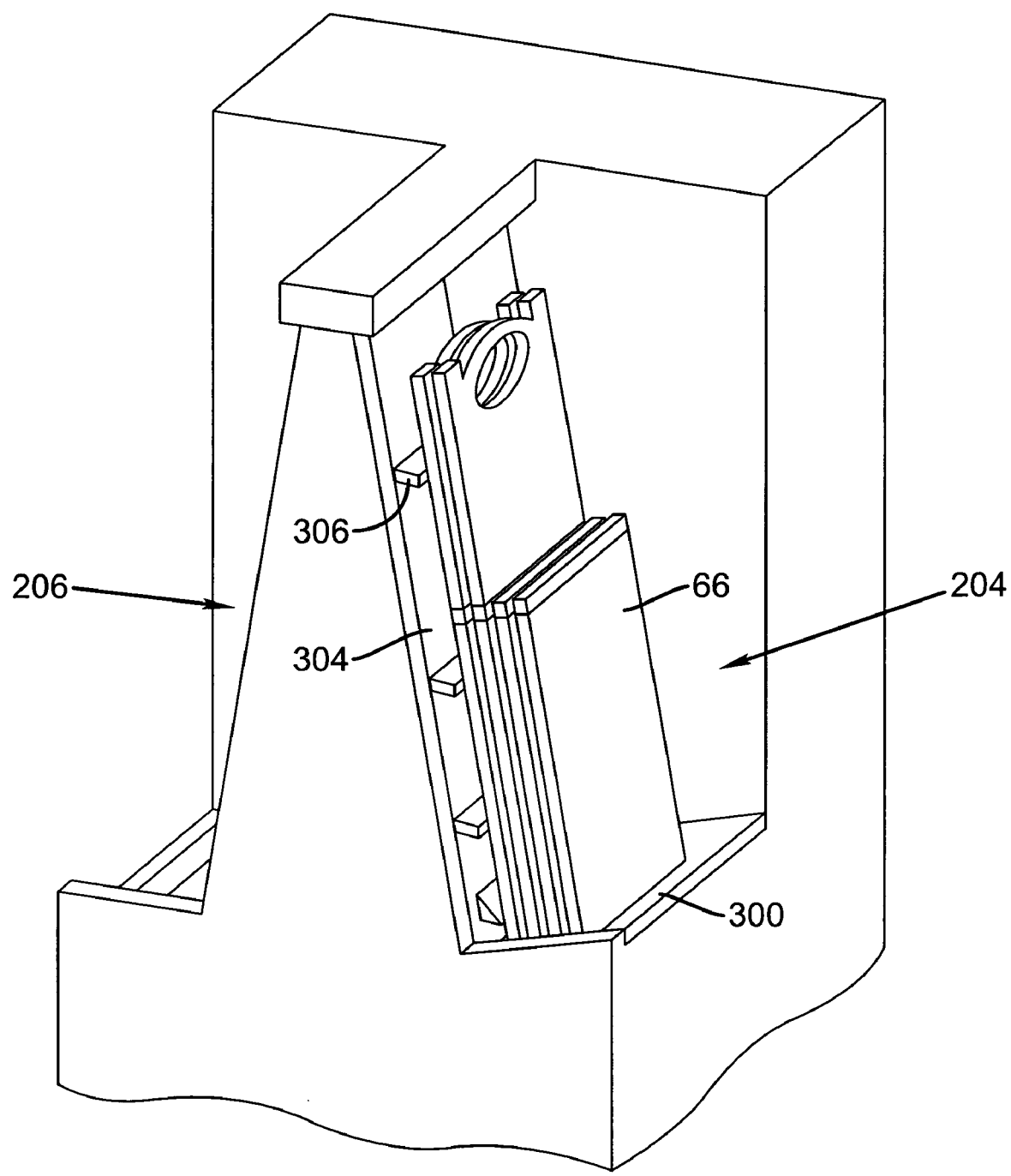
FIGS. 9 and 10 are diagrammatic perspective views of details of the input bin of the embodiment of FIG. 6.
Figure 10:
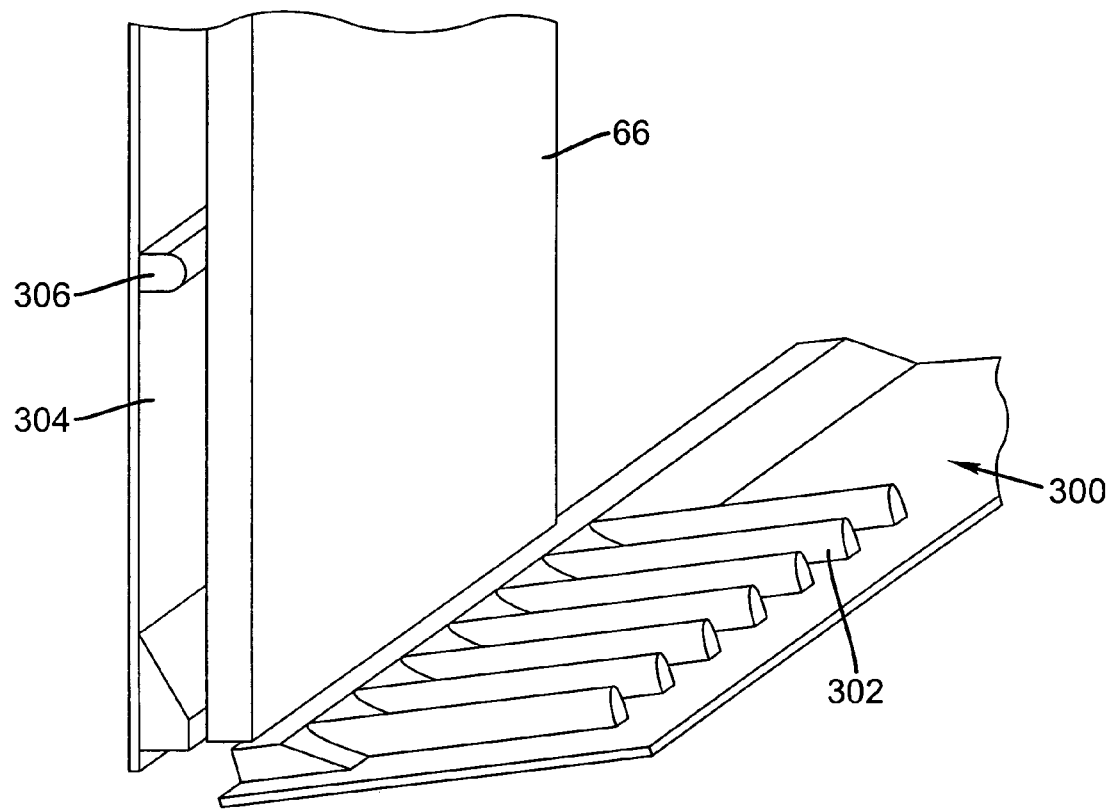

FIGS. 8, 9, and 10 show the input bin in greater detail and illustration of the cassette loading process. As shown in FIGS. 9 and 10, input bin 204 includes an inclined lower wall 300 with ribs 302 and an inclined back wall 304 with ribs 306. Ribs 302 are preferably made from polymer for toughness and low coefficient of friction to facilitate sliding of the cassettes 66 toward back wall 304 through the assistance of gravity. FIG. 8 illustrates loading of multiple cassettes 66 in face-to-face contact and of different sizes from the right side (arrow 308) and from the front (arrow 310) and finally nested against back wall 304 through the bias of gravity (arrow 312). Cassettes 66 are oriented front-to-back with faces facing the sides of autoloader 202. Erased cassettes 66 are shown in output bin 206 waiting for removal.

Figure 11:
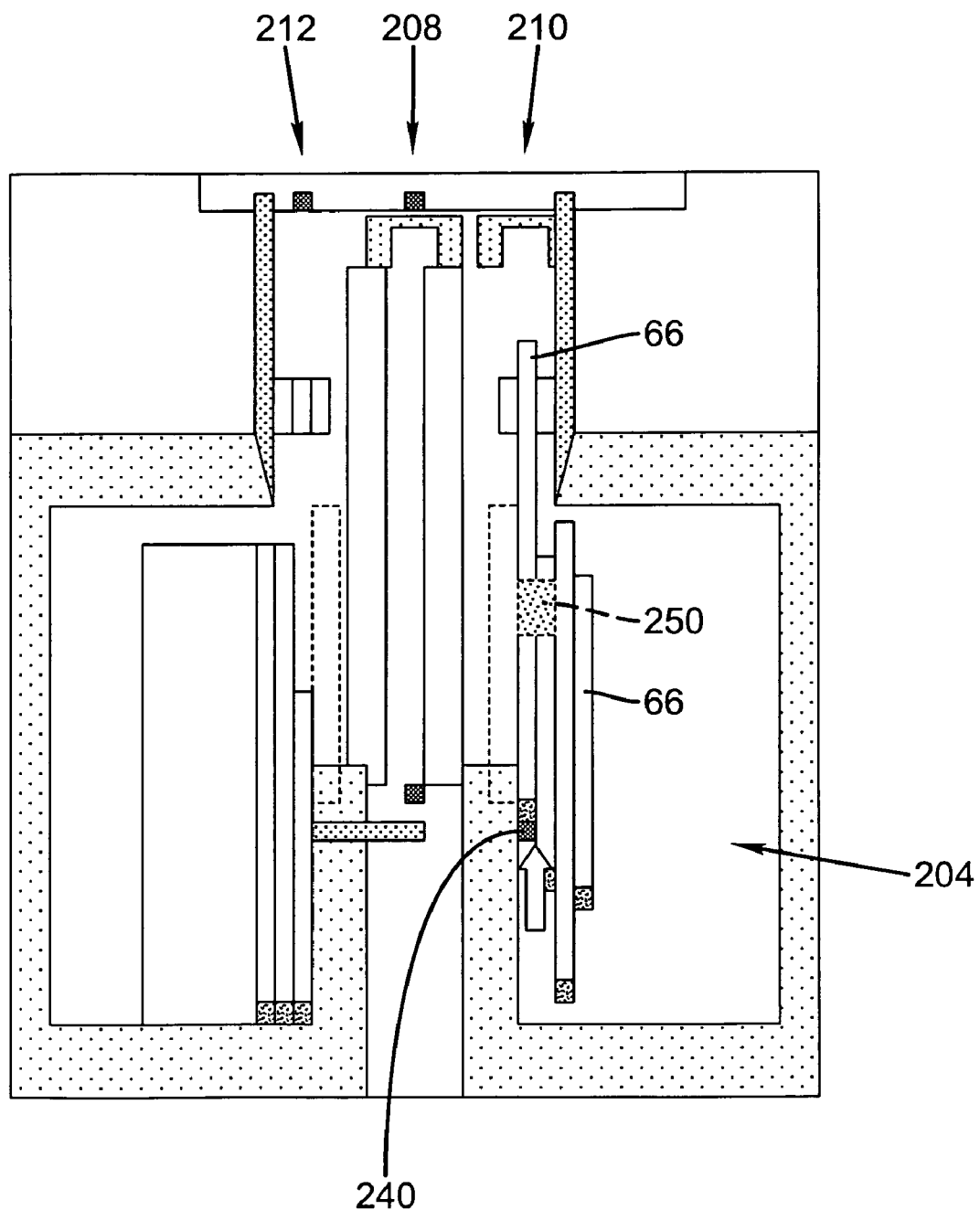
FIG. 11 is a top, plan diagrammatic view of the embodiment of FIG. 6 showing preparation for stack separation.
Figure 12:
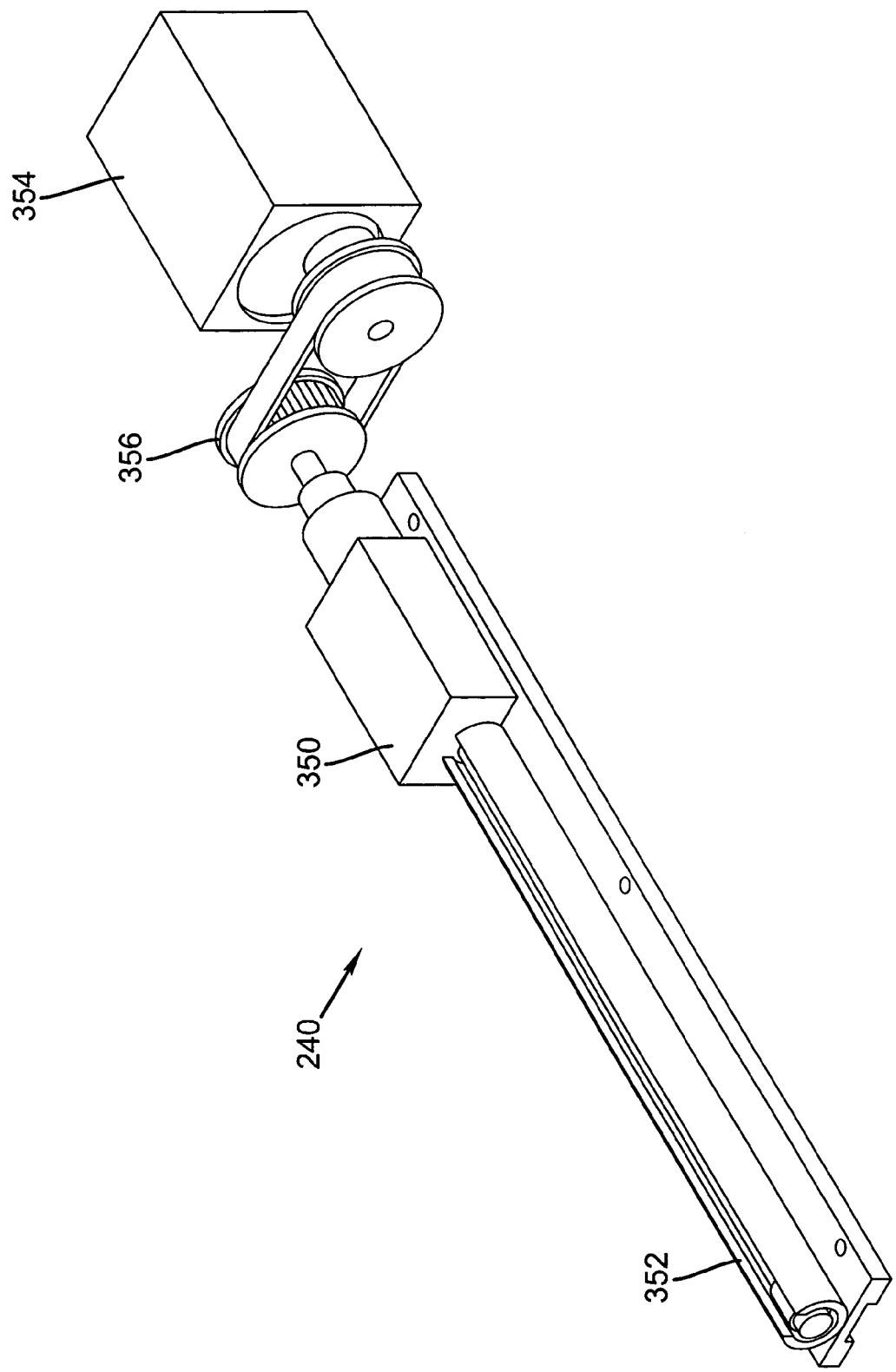
FIG. 12 is a diagrammatic perspective view of a stripper mechanism of the embodiment of FIG. 6.

FIG. 11 show stripper 240 partially stripping a cassette 66 from the input stack in input bin 204 to position the cassette for scanning by bar code scanner 250. An exemplary stripper 240 is shown in FIG. 12 and includes stripper block 350 which engages the bottom of a cassette 66. Block 350 rides on rail 352 which includes a linear drive acting on block 350. The linear drive is driven by motor 354 through belt 356.

Figure 13:
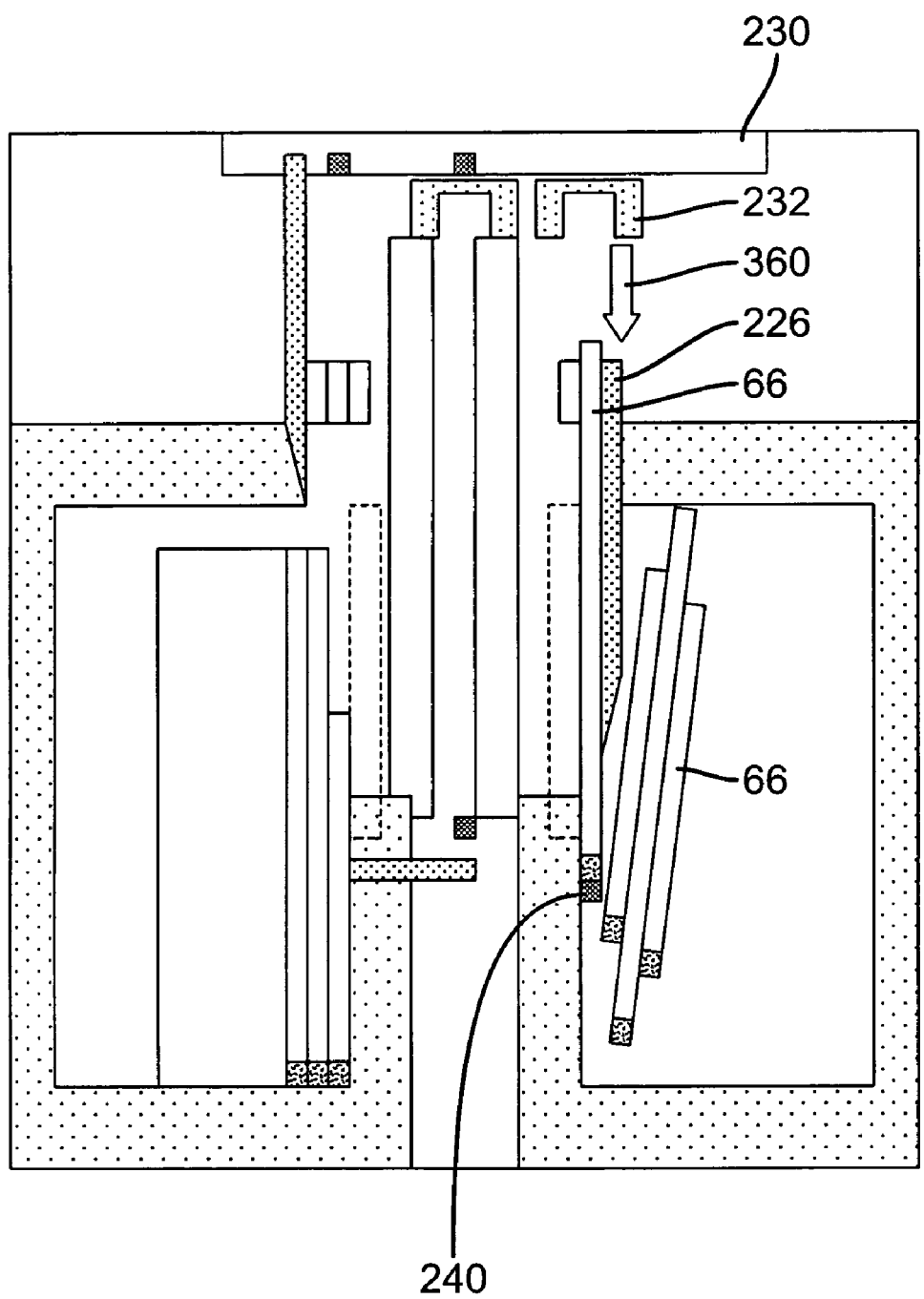
FIG. 13 is a top, plan diagrammatic view of the embodiment of FIG. 6 showing separation of the input stack of storage phosphor cassettes.
Figure 14:
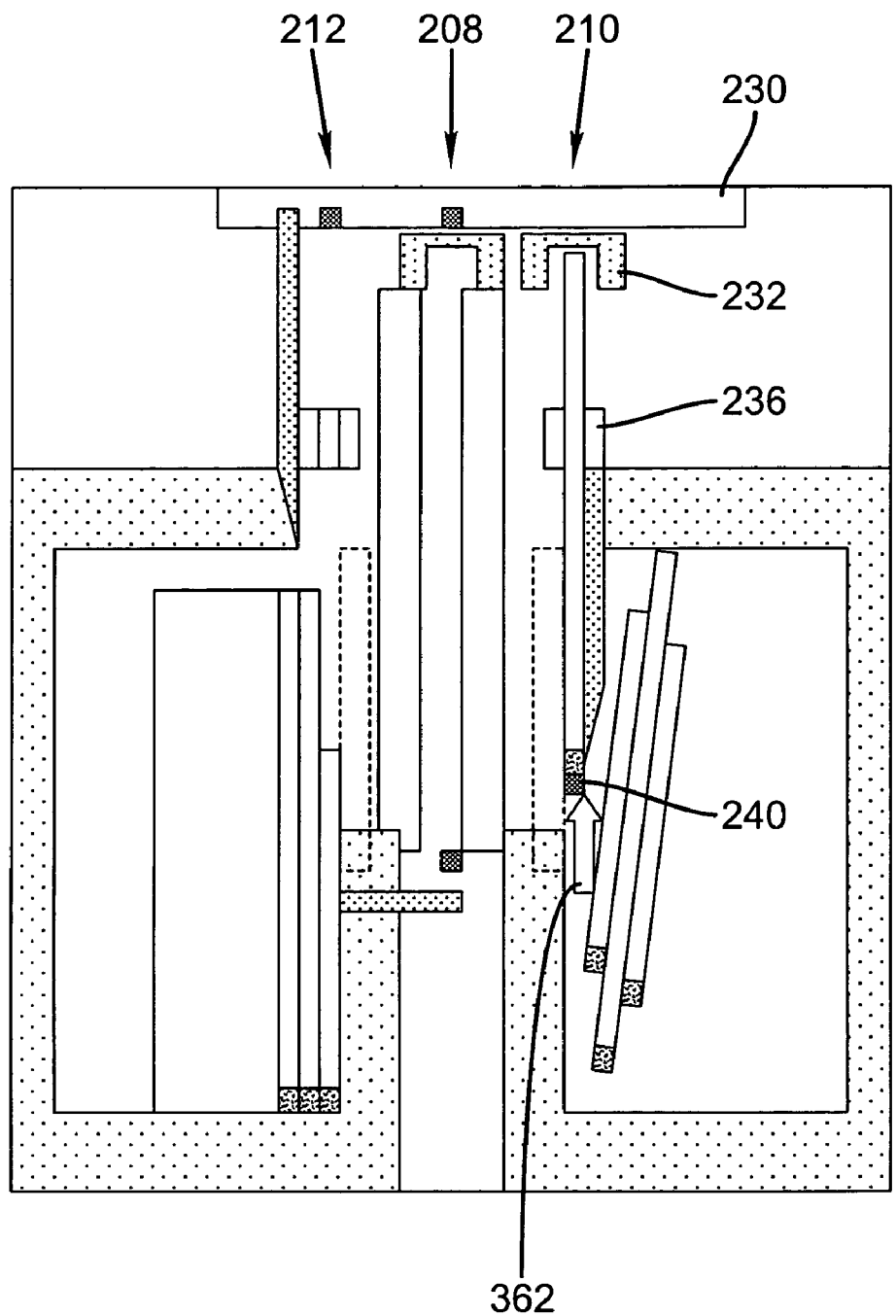
FIGS. 14, 15, and 16 are respective top, plan diagrammatic views of the embodiment of FIG. 6 showing translation of an unread storage phosphor cassette to the pre-read location, retraction of the input telescoping wall and input stripper mechanism, and transport of the cassette from the pre-read location to the read location.
Figure 15:
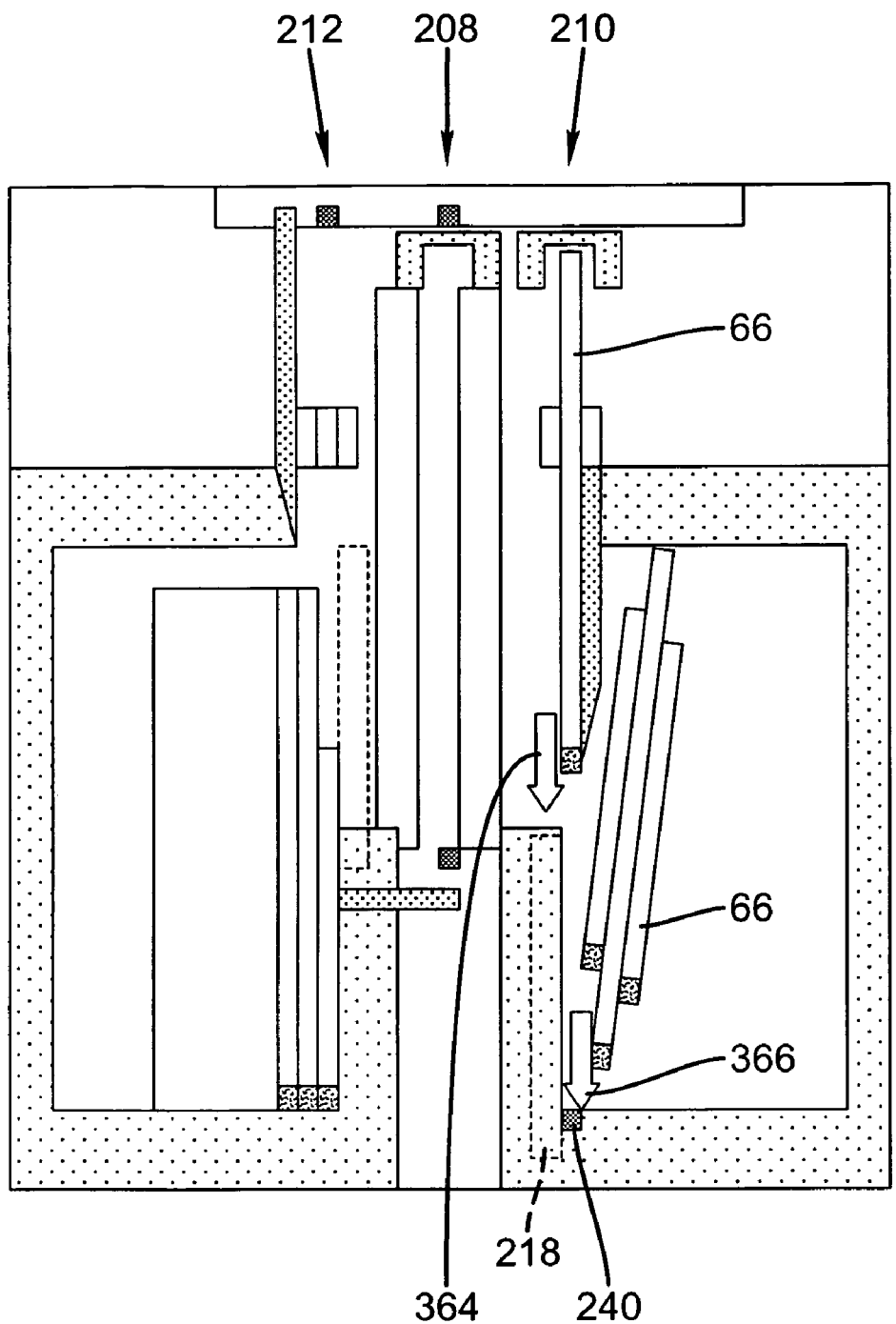
Figure 16:
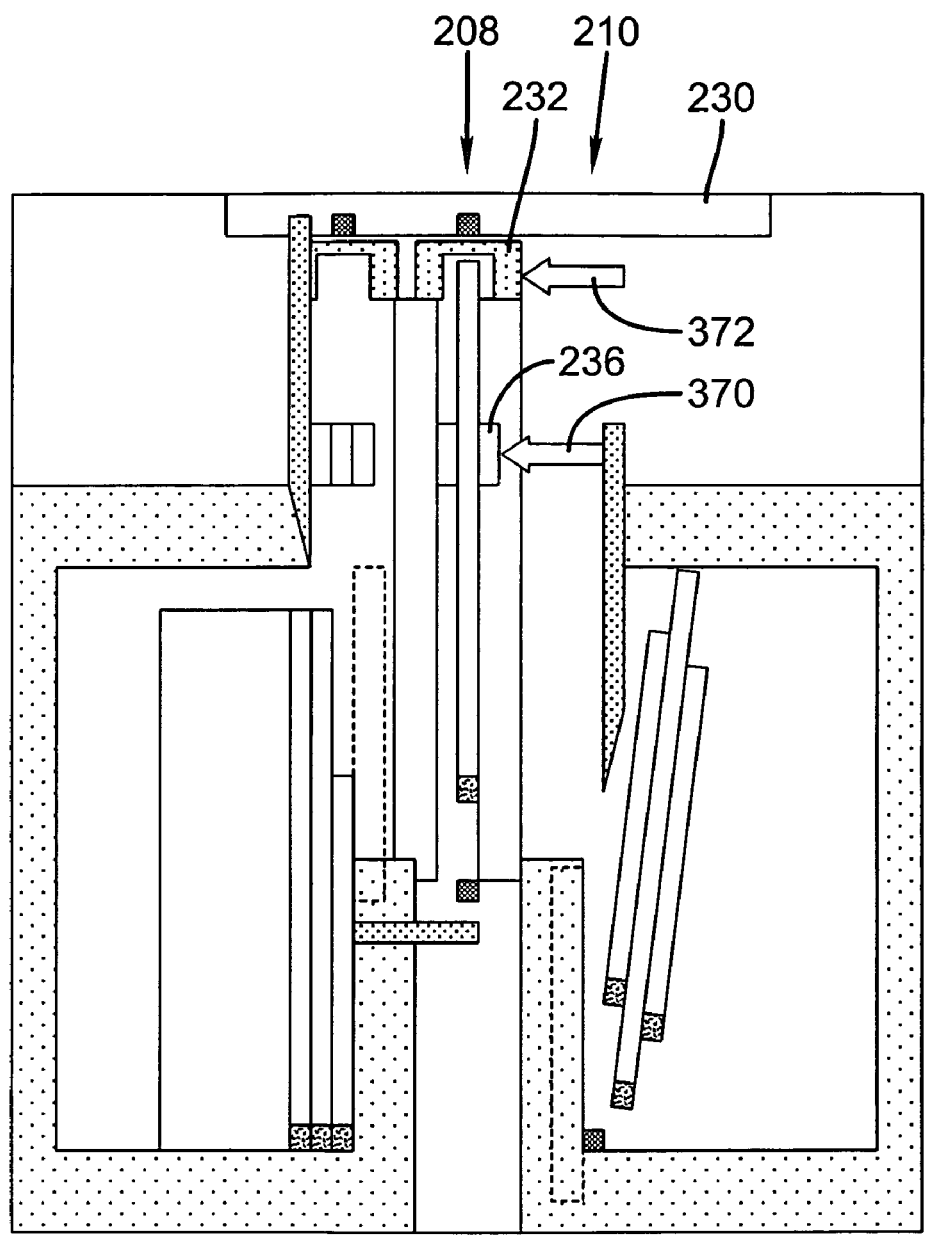

FIG. 13 shows stack separator 226 moved in the direction of arrow 360 to move the remaining stack of cassettes 66 up the incline of bottom wall 300 to free the cassette 66 being transported by stripper 240. In FIG. 14 stripper 240 completes the translation of the cassette 66 (arrow 362) into the pre-read location 210 and engagement by loader 236 and cup 232 of transport 230. FIG. 15 shows input telescoping wall 218 being retracted (arrow 364) to provide clearance to translate the unread cassette 66 from pre-read location 210 to read location 208. Stripper 240 is also returned to the home position (arrow 366) in preparation for the next unread cassette 66 to be stripped. FIG. 16 shows unread cassette 66 transported from pre-read location 210 to read location 208 by loader 236 (arrow 370) and transport 230 cup 232 (arrow 372).

Figure 17:
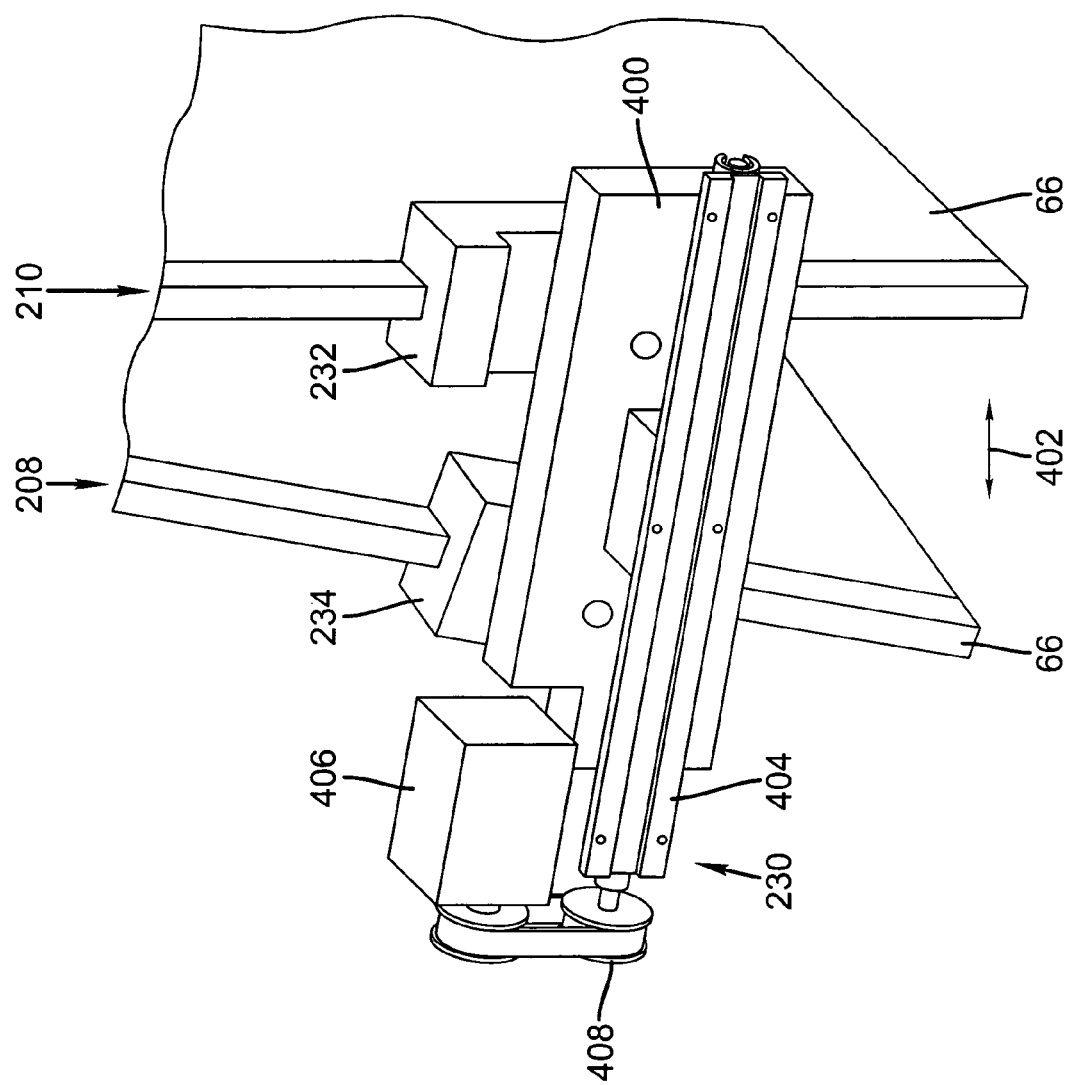
FIGS. 17, 18 and 19 are diagrammatic views showing components of the embodiment of FIG. 6.
Figure 18:
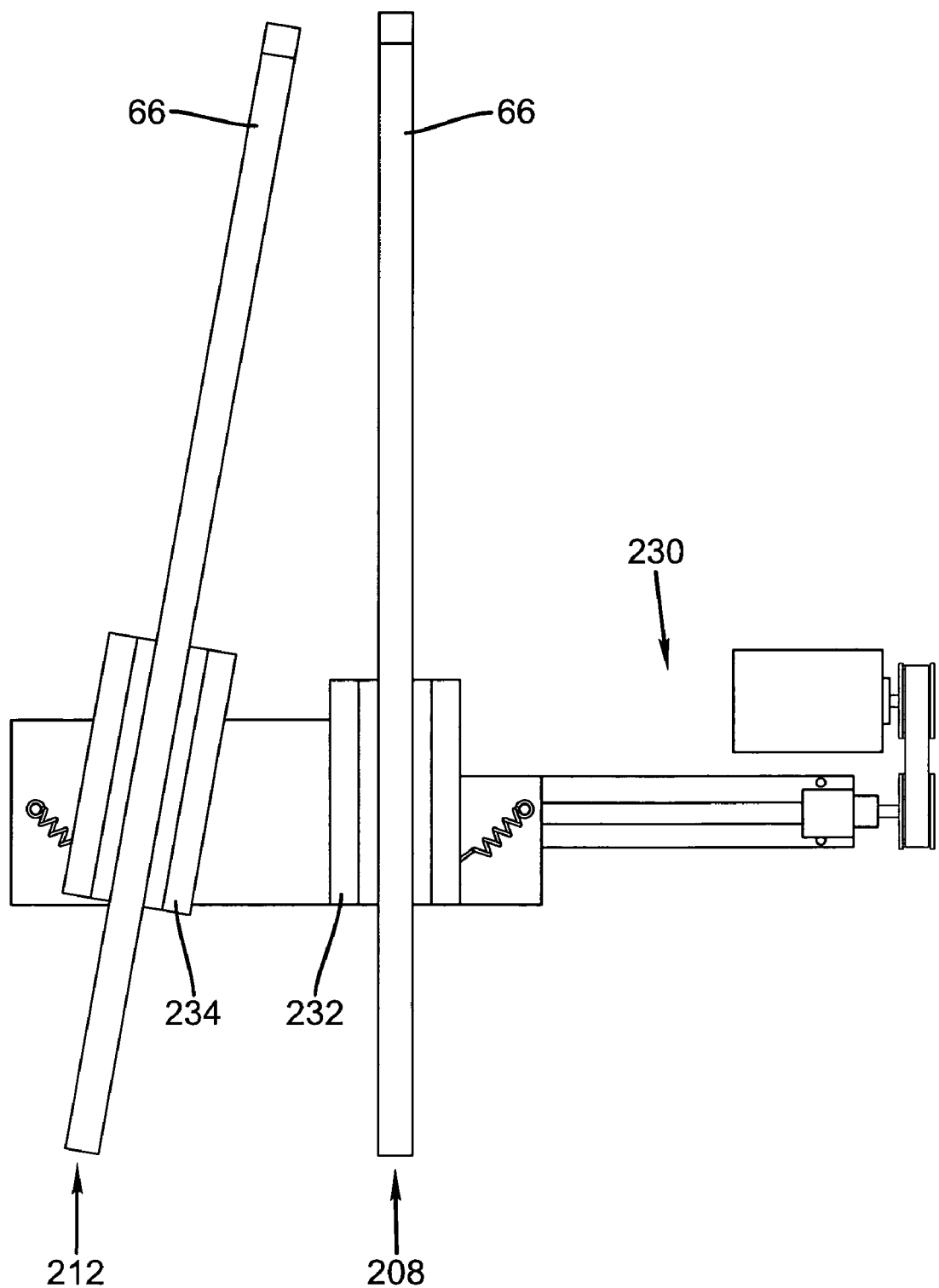

Transport 230 is shown in FIG. 17 as including a carrier 400 which supports cups 232 and 234 for movement in reverse directions (arrow 402), a linear drive 404, a motor 406 which drives linear drive 404 through belt 408. In FIG. 17, cup 232 is shown engaging an unread cassette 66 at pre-read location 210 and cup 234 as engaging a cassette 66 at read location 208. In FIG. 18, transport 230 is shown with cup 232 engaging a cassette 66 at read location 208 and cup 234 engaging an erased cassette at post-read location 212 after transport from read location 208.

Figure 19:
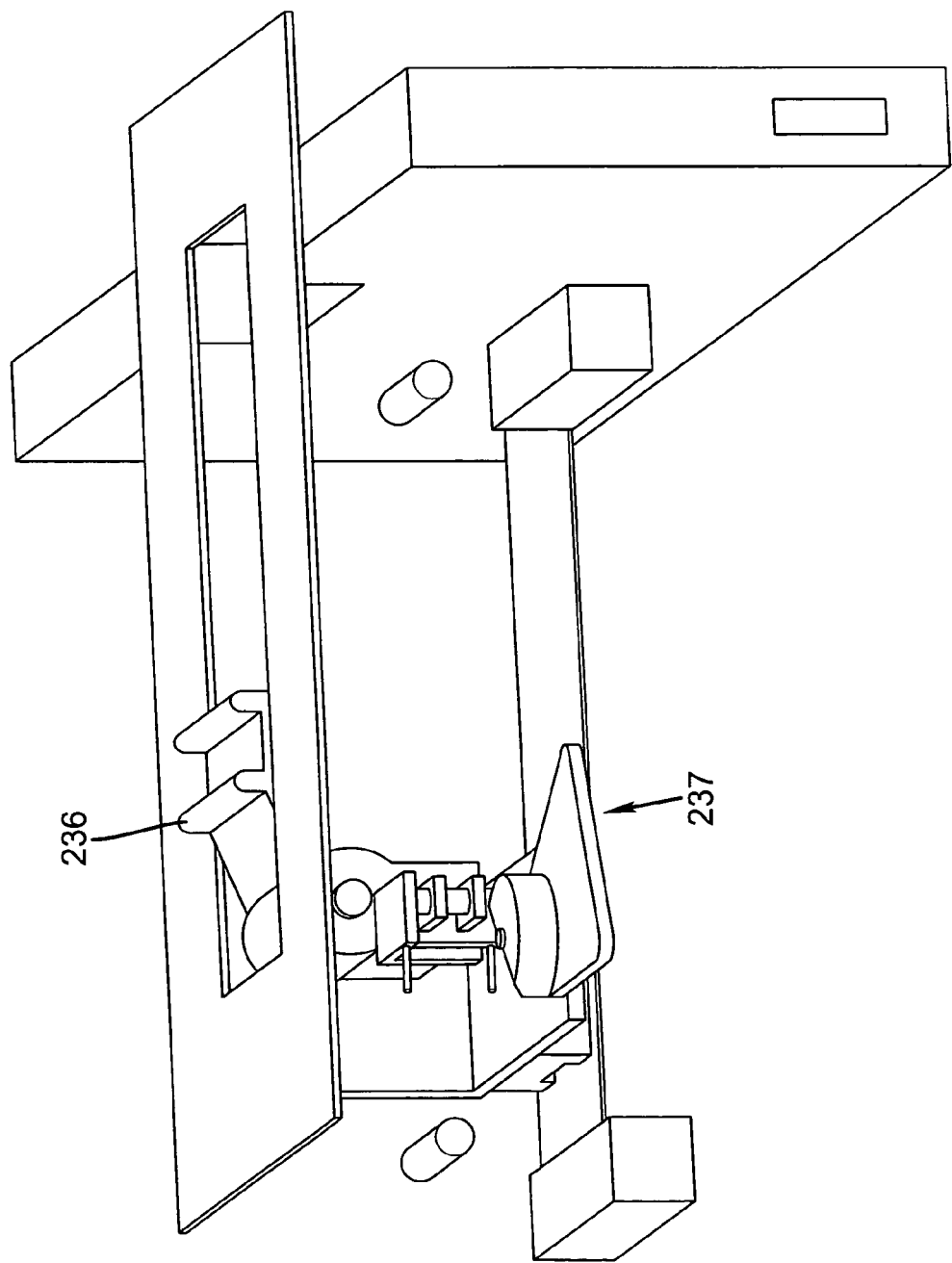
Figure 20:
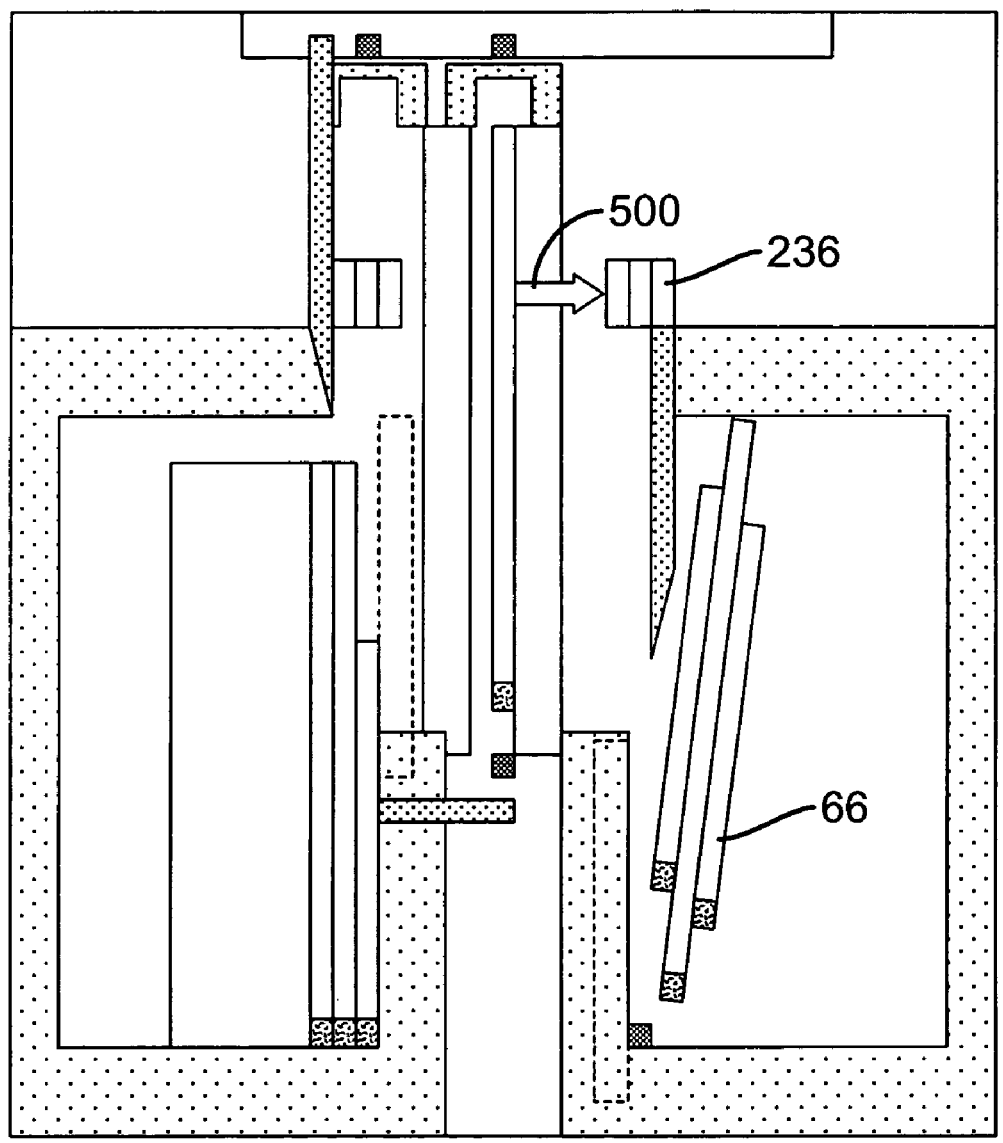
FIG. 20 is a top, plan diagrammatic view of the embodiment of FIG. 6 showing return of the input loader.

FIG. 19 shows loader 236 and loader drive 237. FIG. 20 shows unloader 236 returned to the home position (arrow 500) in preparation for the next unread cassette 66.

Figure 21:
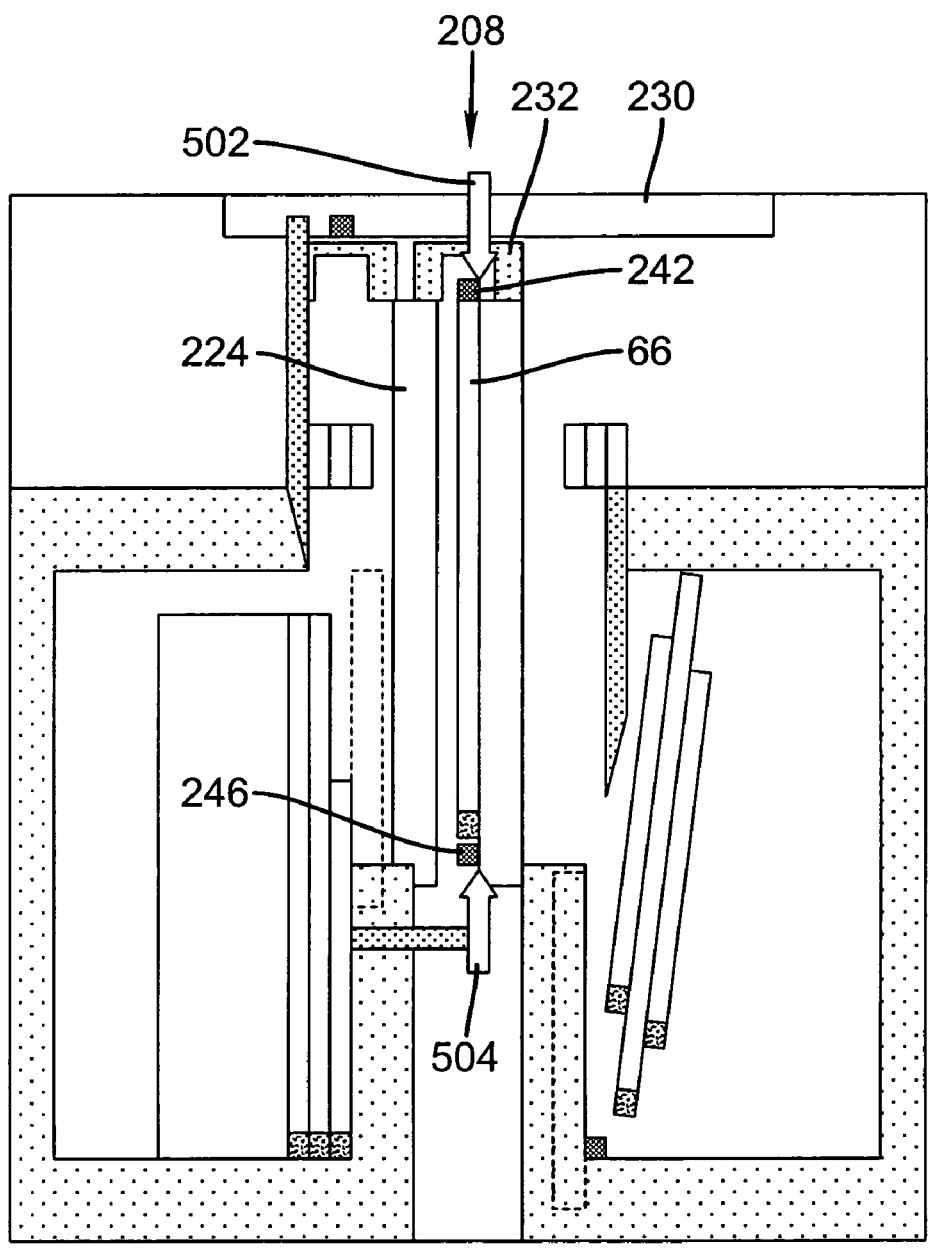
FIG. 21 is a top, plan diagrammatic view of the embodiment of FIG. 6 showing engagement of the clamps at the read location.
Figure 22:
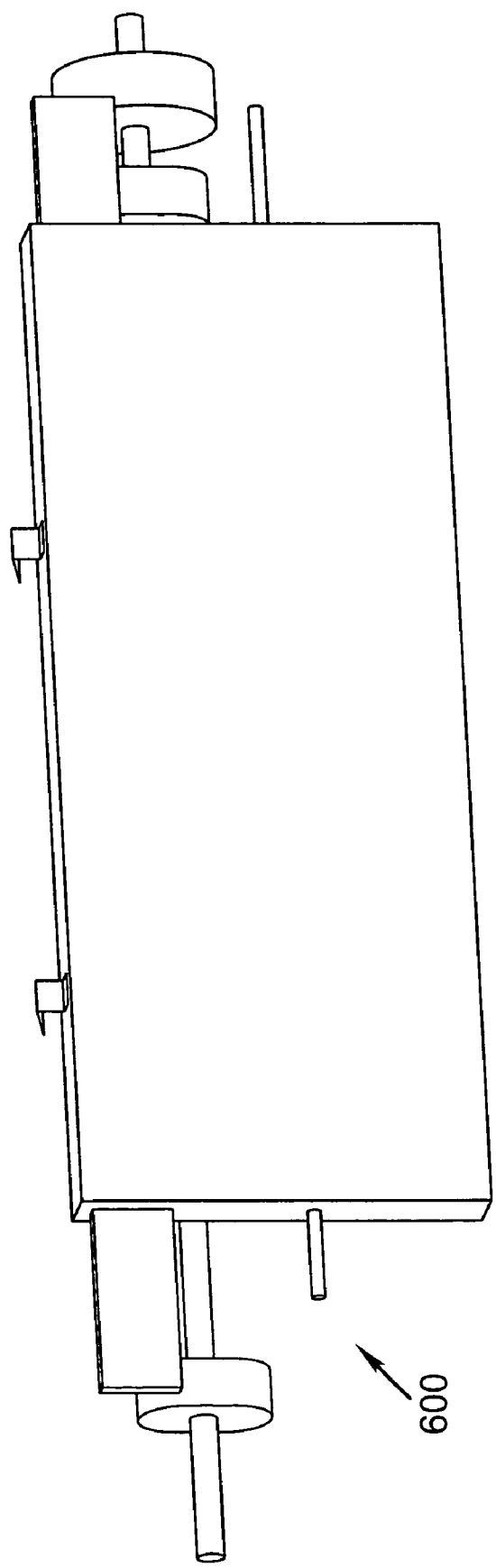
FIG. 22 is a diagrammatic perspective view of a storage phosphor extraction bar and hook mechanism.

FIG. 21 shows ejector 242 ejecting cassette 66 from transport cup 232 (arrow 502), size changer/light curtain 246 actuated (arrow 504), and clamp 224 actuated in preparation for removal of the storage phosphor in cassette 66 at read location 208. The storage phosphor is read, erased, and replaced in cassette 66. FIG. 22 shows an example of an extraction bar and hook mechanism 600 for effecting these operations. Mechanism 600 is associated with the storage phosphor vertical transport assembly shown in FIGS. 4 and 5.

Figure 23:
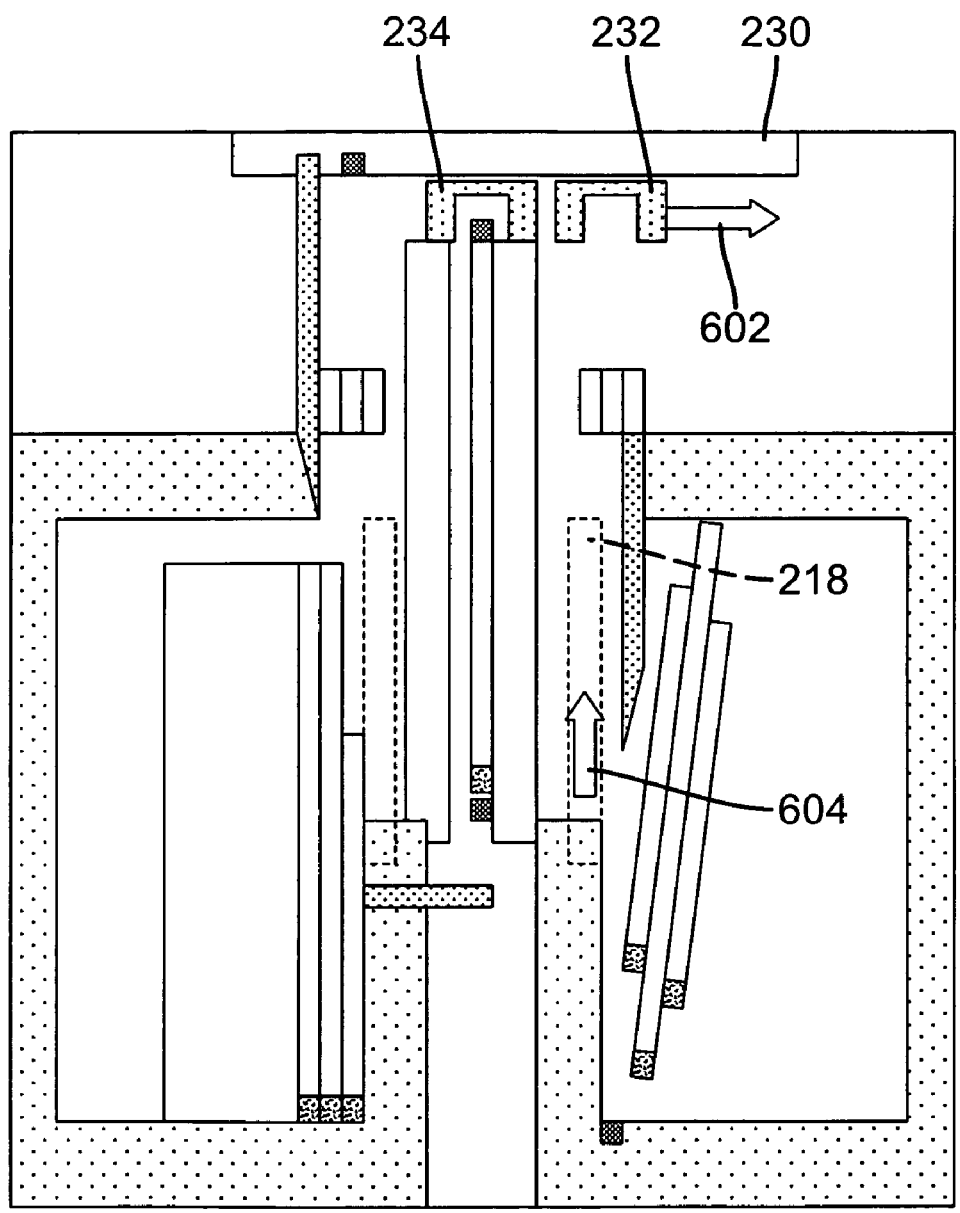
FIGS. 23-26 are top, plan diagrammatic views of the embodiment of FIG. 6 showing operations preparing for the next scan cycle.
Figure 24:
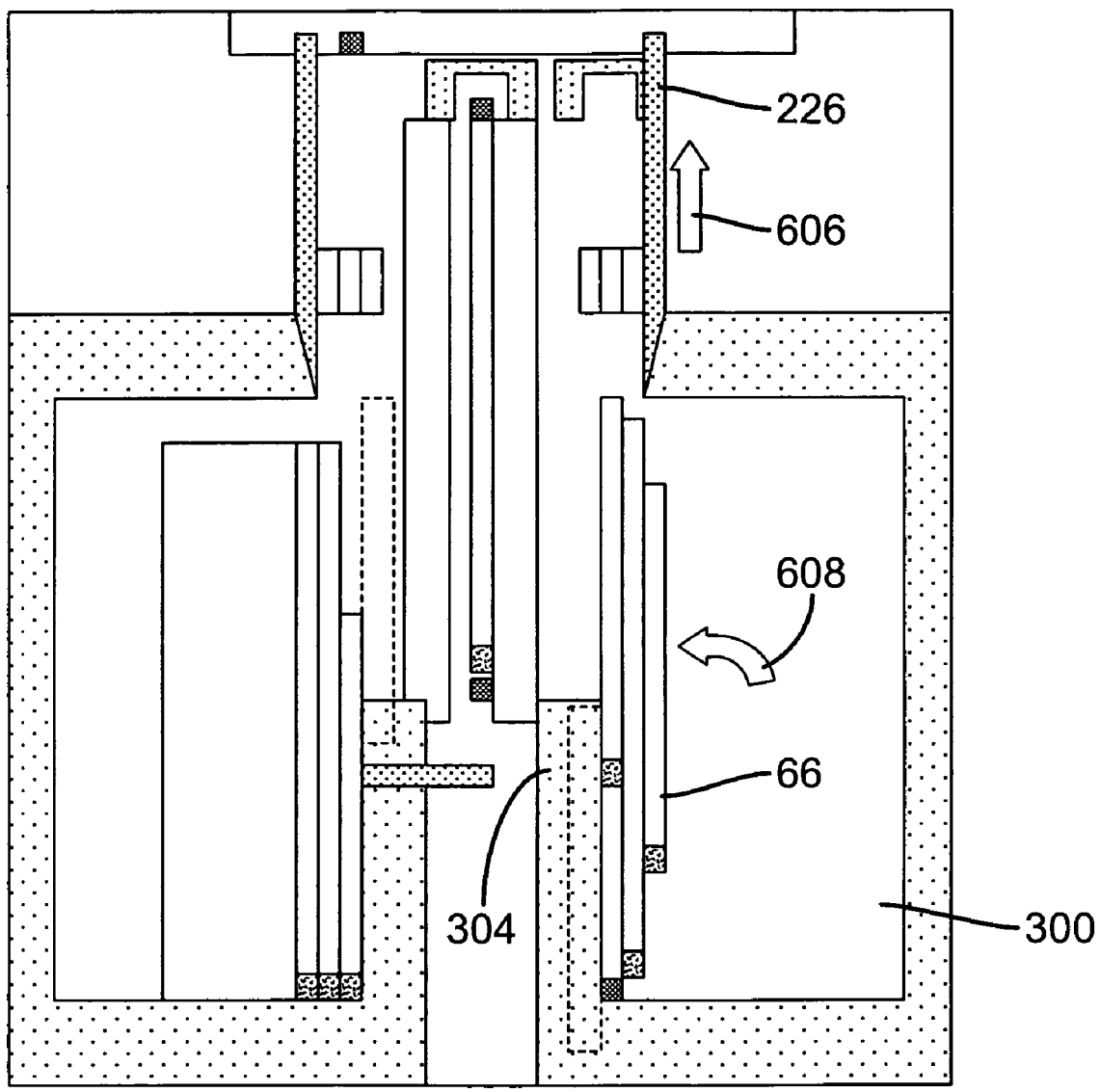
Figure 25:
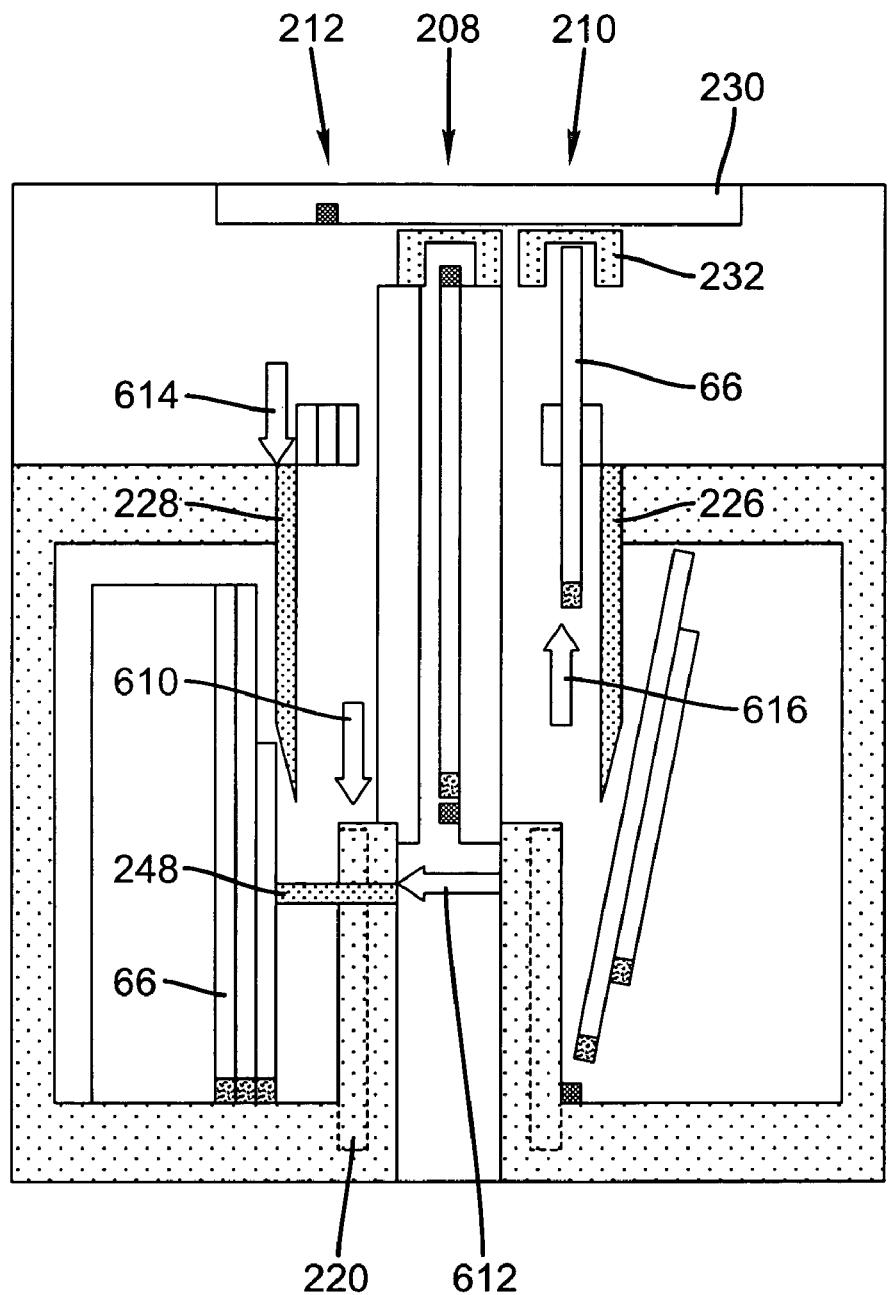

FIGS. 23-25 show operations for preparation for the next scan. In FIG. 23, transport 230 cups 232 and 234 are returned to the home position (arrow 602), and input telescoping wall 218 is returned to the home position (arrow 604). In FIG. 24, stack separator 226 is returned to the home position (arrow 606) and the input stack of cassettes 66 slides down inclined bottom wall 300 (arrow 608) nesting on wall 304. In FIG. 25, output telescoping wall 220 is retracted (arrow 610), output stack lifter mechanism 248 lifts the output stack of cassettes 66 (arrow 612) to create a gap for output stack separator 228 and the erased cassette 66 at post-read location 212. Output stack separator 228 engages the output stack of cassettes 66 (arrow 614) to prevent the output stack from tipping into the postread location 212. Input stack separator 226 is actuated to hold back the input stack while the next unread cassette 66 is separated from the input stack and transported into transport cup 232 (arrow 616).

Figure 26:
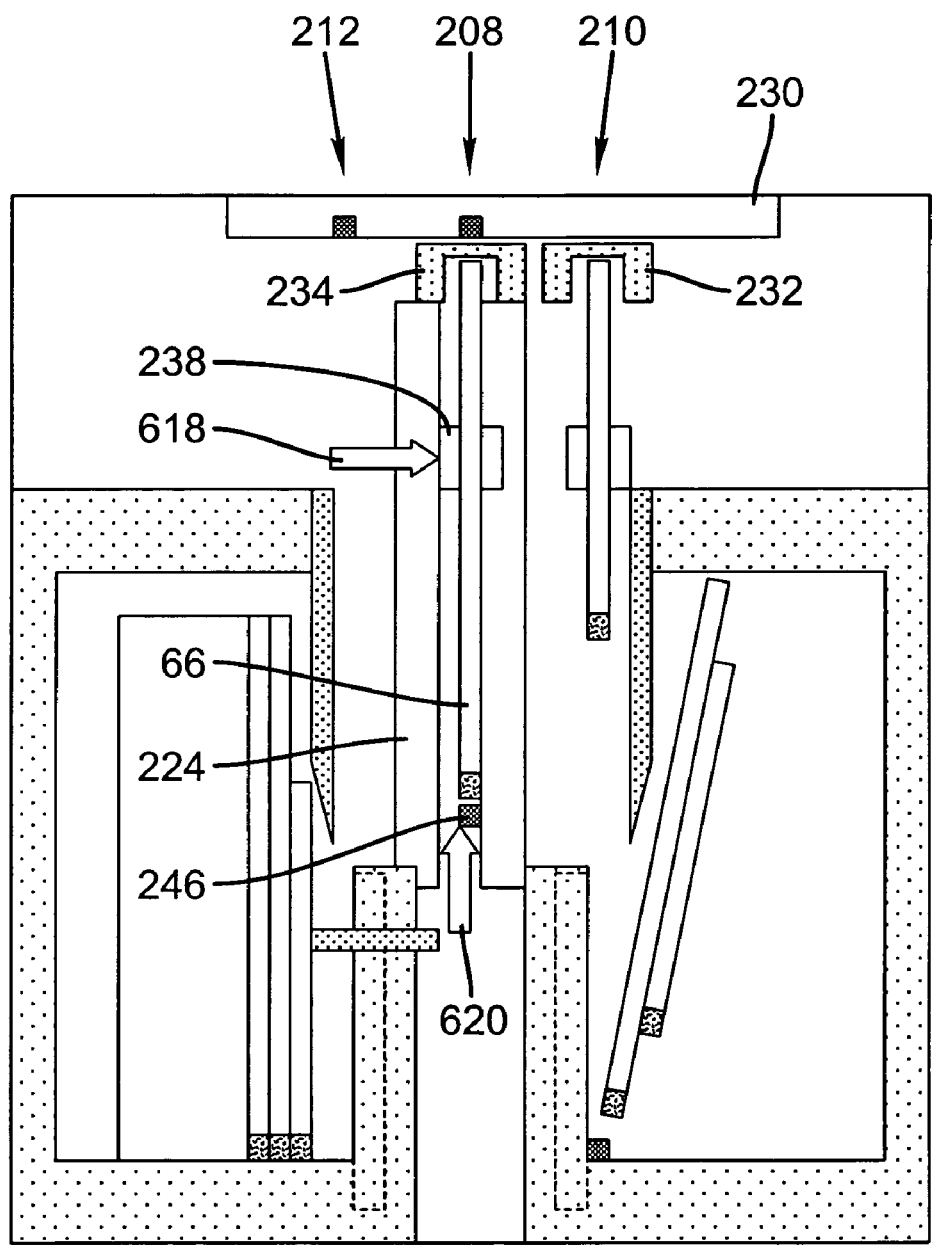

In FIG. 26, unloader 238 is moved to the read location 208 (arrow 618) to engage the erased cassette 66 and size changer 246 moves erased cassette 66 into transport cup 234 (arrow 620) to prepare for transport to post-read location 212. Clamp 224 is also unclamped from erased cassette 66.

Figure 27:
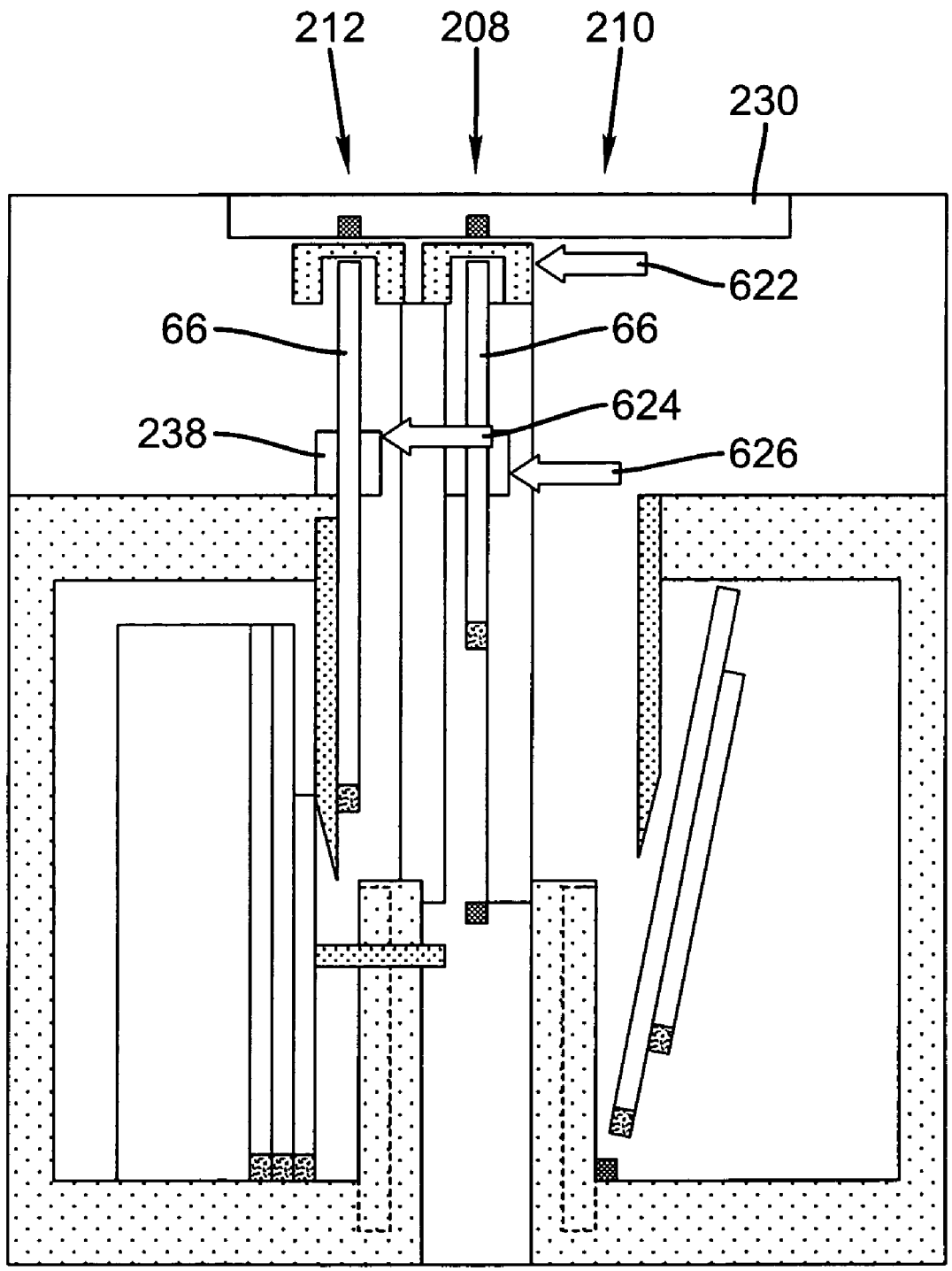
FIG. 27 is a top, plan diagrammatic view of the embodiment of FIG. 6 showing transport of the read storage phosphor cassette from the read location to a post-read location and transport of the next unread storage phosphor cassette into the read location.

In FIG. 27, transport 230 and unloader 238 and loader 236 respectively transport the erased cassette 66 from read location 208 to post-read location 212 and the next unread cassette 66 from pre-read location 210 to read location 208 (arrows 622, 624, and 626).

Figure 28:
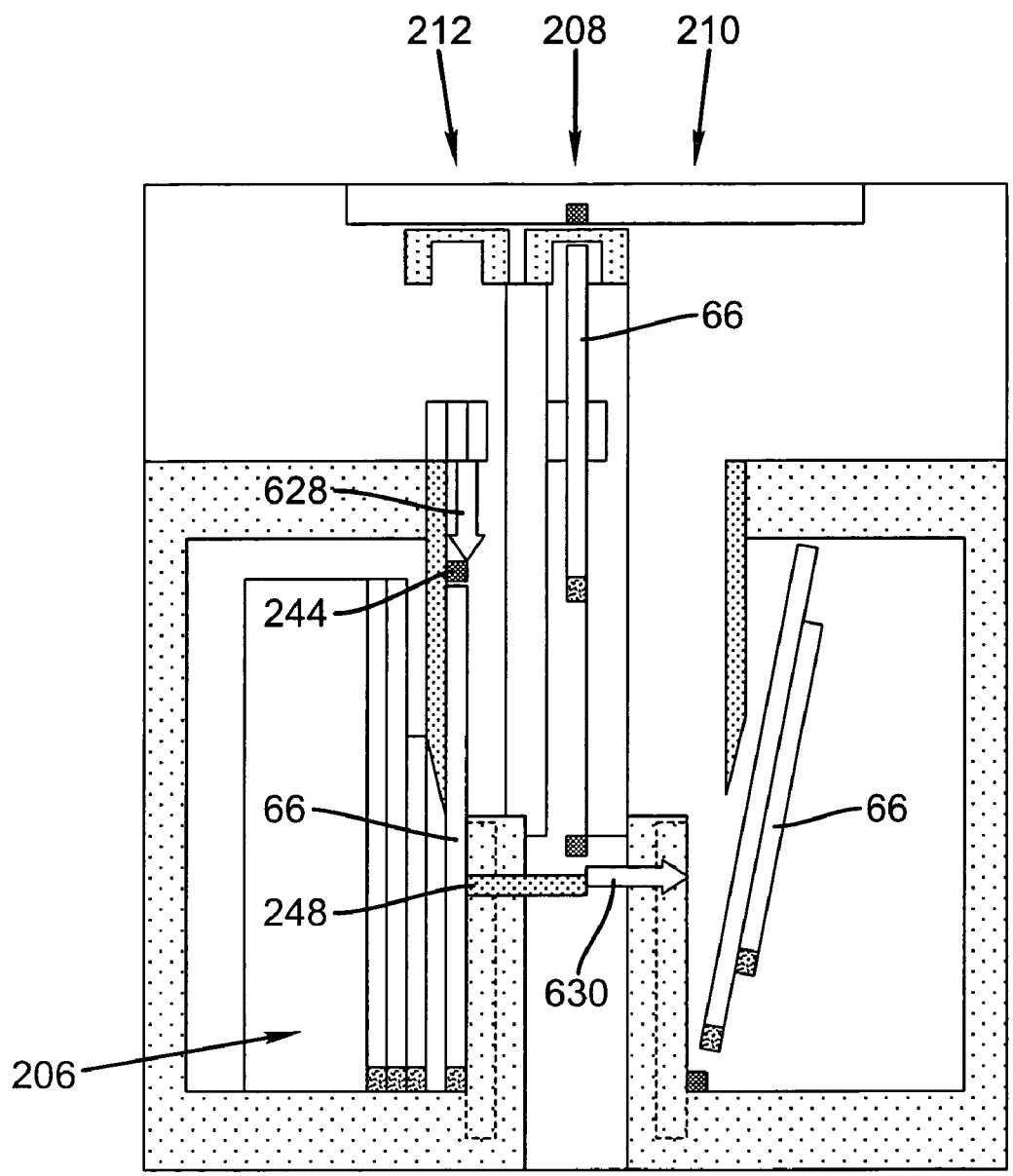
FIG. 28 is a top, plan diagrammatic views of the embodiment of FIG. 6 showing transport of the read storage phosphor cassette into the output bin.

In FIG. 28, ejector 244 ejects the erased cassette 66 into the output bin 206 (arrow 628) and output stack lifter mechanism 248 is returned to the home position (arrow 630).

Figure 29:
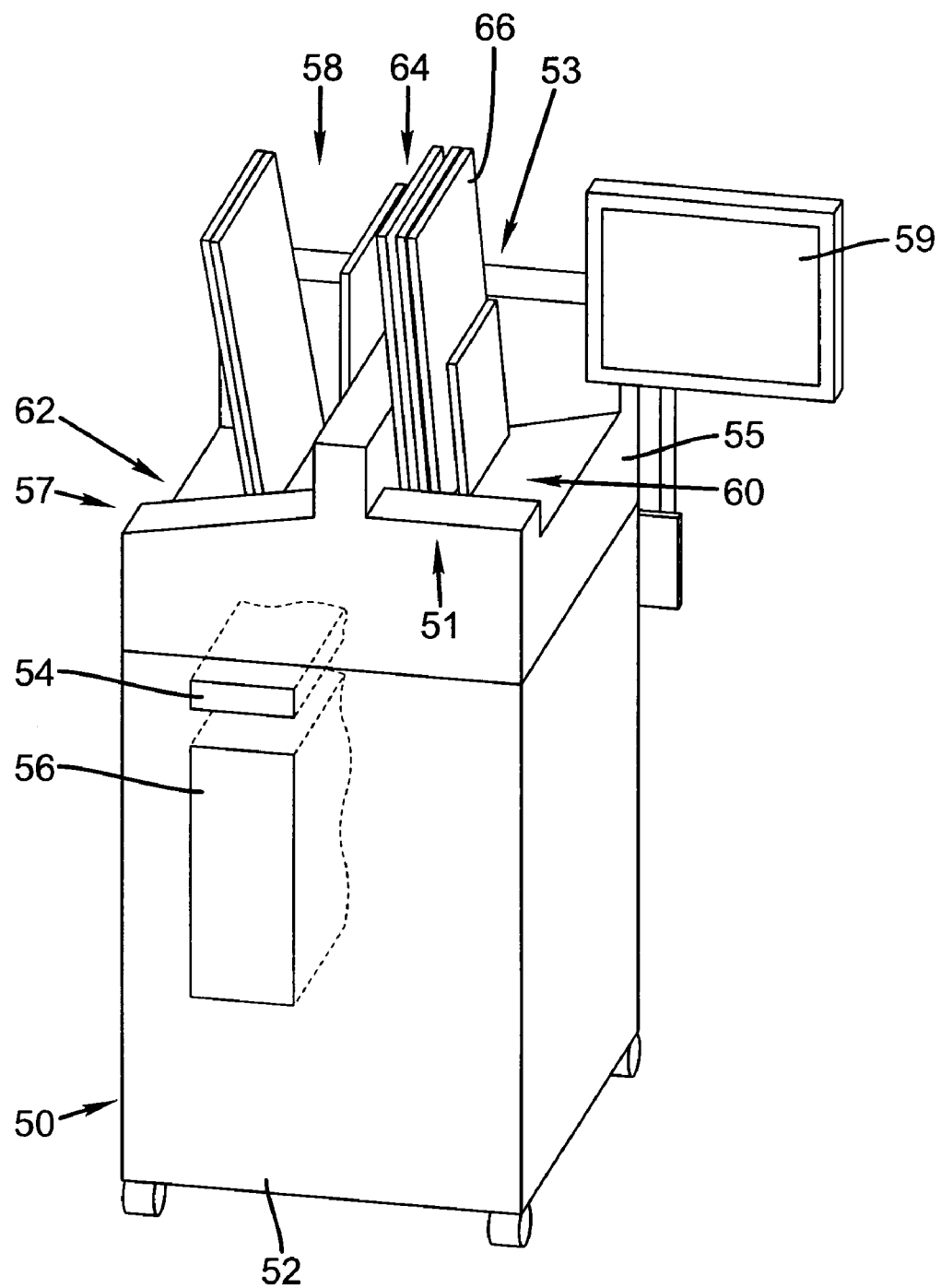
FIGS. 29, 30, and 31 are respective right front perspective, diagrammatic side elevational, and diagrammatic top plan views showing a storage phosphor reader including another embodiment of the present invention.

FIG. 29 is a right front perspective view of a storage phosphor reader including another embodiment of the multicassette vertical autoloader of the present invention. As shown, storage phosphor reader 50 includes a housing 52 for supporting the components of reader 50, such as read module 54 and erase module 56. Multicassette, vertical autoloader 58 is mounted on the top of and forms an integral part of reader 50 and thus occupies the same footprint as reader 50. Autoloader 58 includes an input bin 60, an output bin 62 and a storage phosphor read location 64 located between input bin 60 and output bin 62. Input bin 60, read location 64, and output bin 62 are inline with each other. Autoloader 50 includes a front 51, back 53, and opposite sides 55 and 57. A display 59 is also provided.

Figure 30:
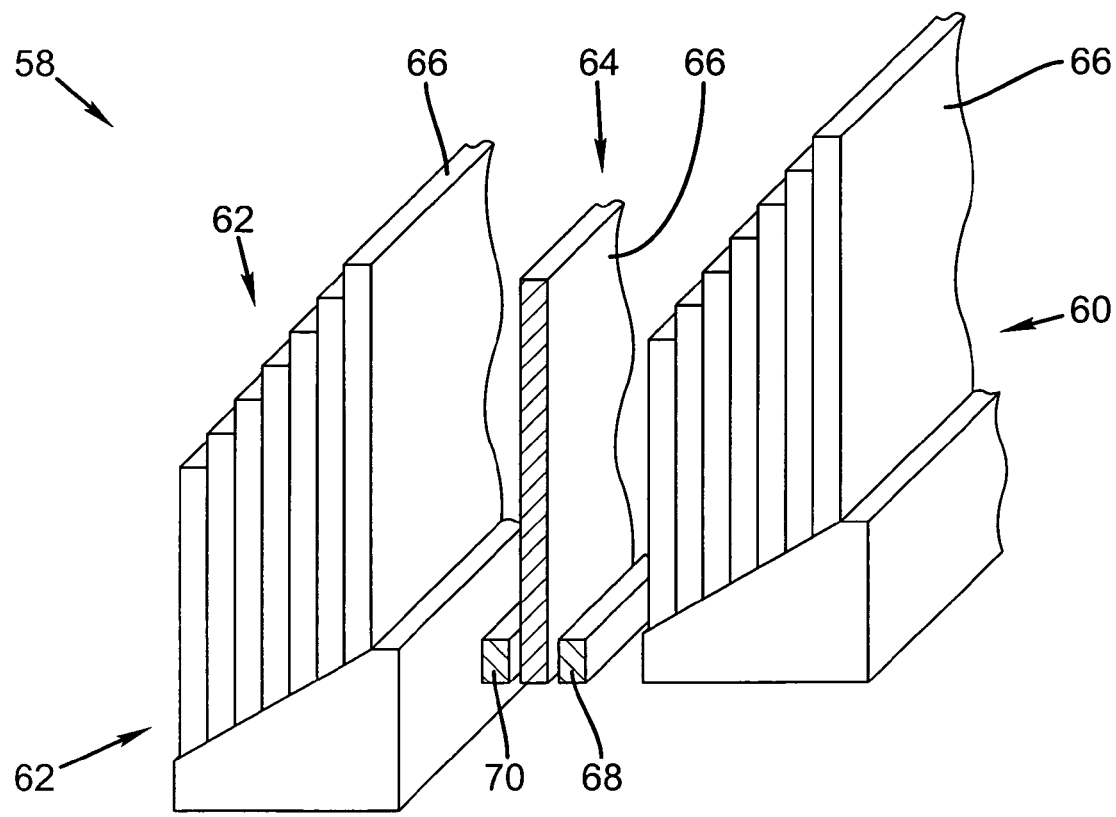
Figure 31:
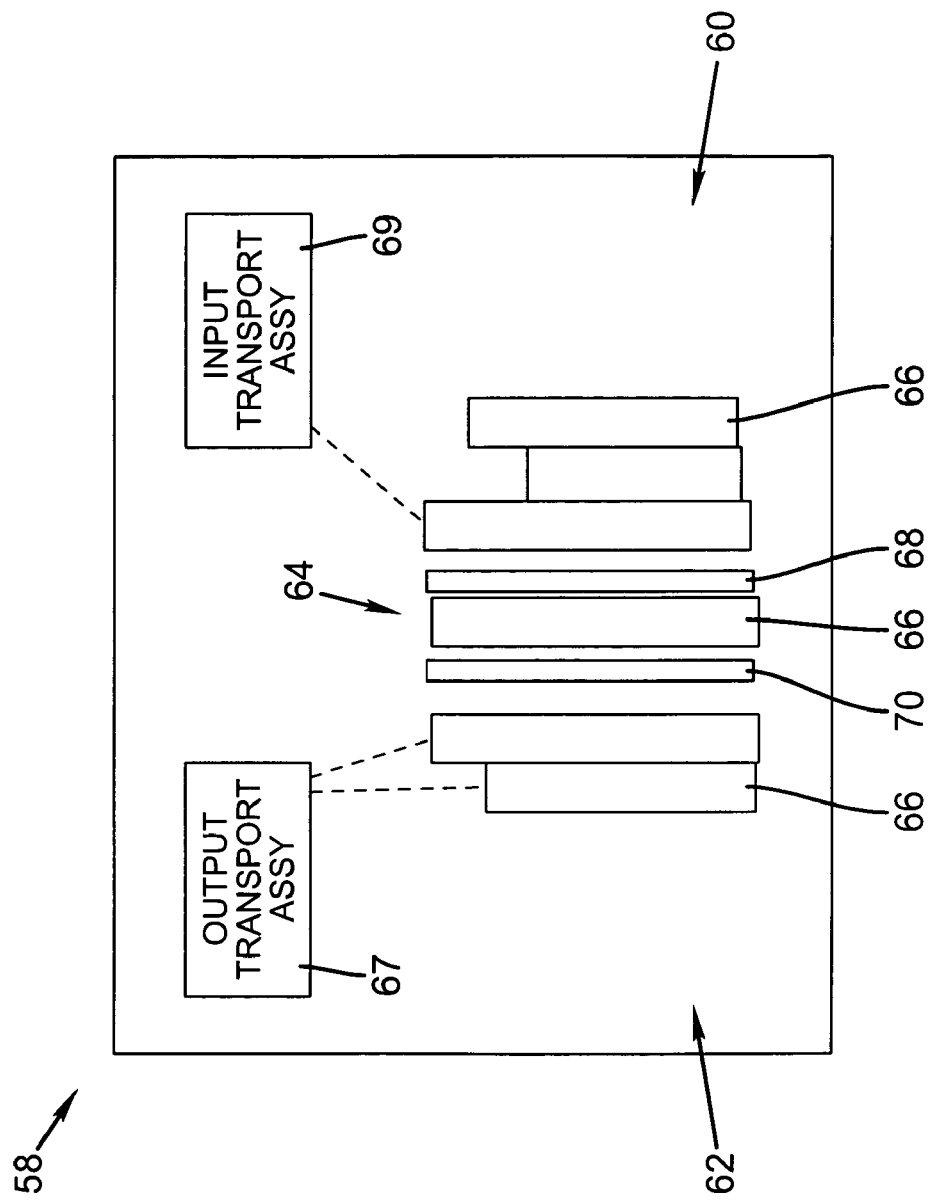

One or more unread storage phosphor cassettes 66 (each of which contains a storage phosphor which is removable from cassette 66) are loaded as a stack into input bin 60 in face-to-face contact. Cassettes 66 are oriented front-to-back with faces facing the sides of autoloader 58. The cassettes 66 are oriented from the front 51 to back 53 of autoloader 50 with faces facing sides 55, 57. The foremost cassette 66 in the stack of cassettes 66 is transported from input bin 60 to the storage phosphor read location 64. At read location 64, the storage phosphor contained in cassette 66 is removed from cassette 66 and transported vertically past read module 54 and erase module 56. The read and erased storage phosphor is then replaced in cassette 66 which is transported out of read location 64 to output bin 62 for subsequent removal. FIG. 30 shows a diagrammatic view of the inline path of a cassette 66 assisted by gravity from bin 60 into read location 64 where it is held by clamps 68 and 70 during the read and erase cycle, and then to output bin 62. FIG. 31 is a diagrammatic plan view showing the same thing. An input cassette transport assembly 69 and an output cassette transport assembly 67 (such as described above) effects transport of the cassette 66.

Figure 32:
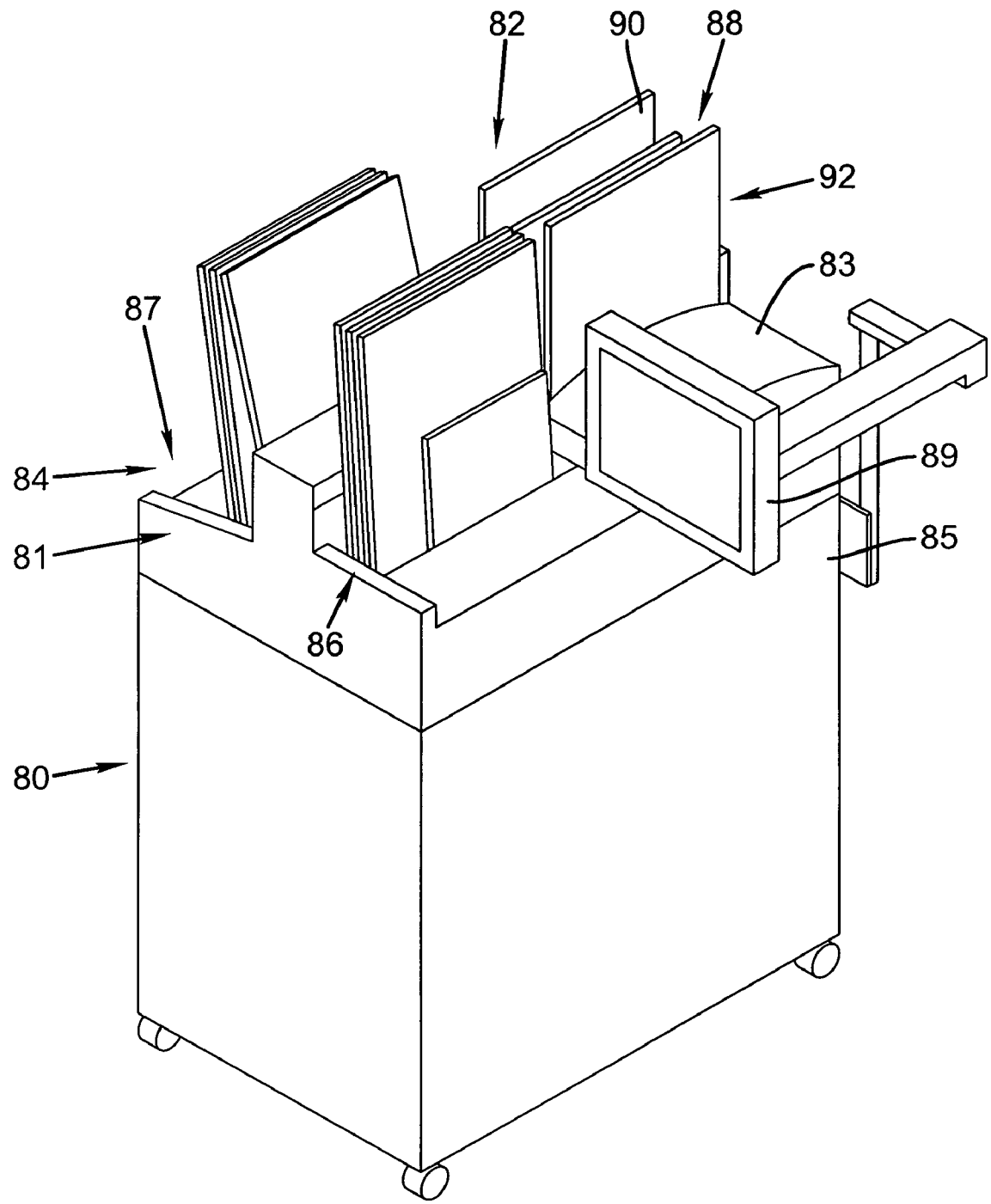
FIGS. 32 and 33 are respective left front perspective and diagrammatic top plan views of a storage phosphor reader including another embodiment of the present invention.
Figure 33:
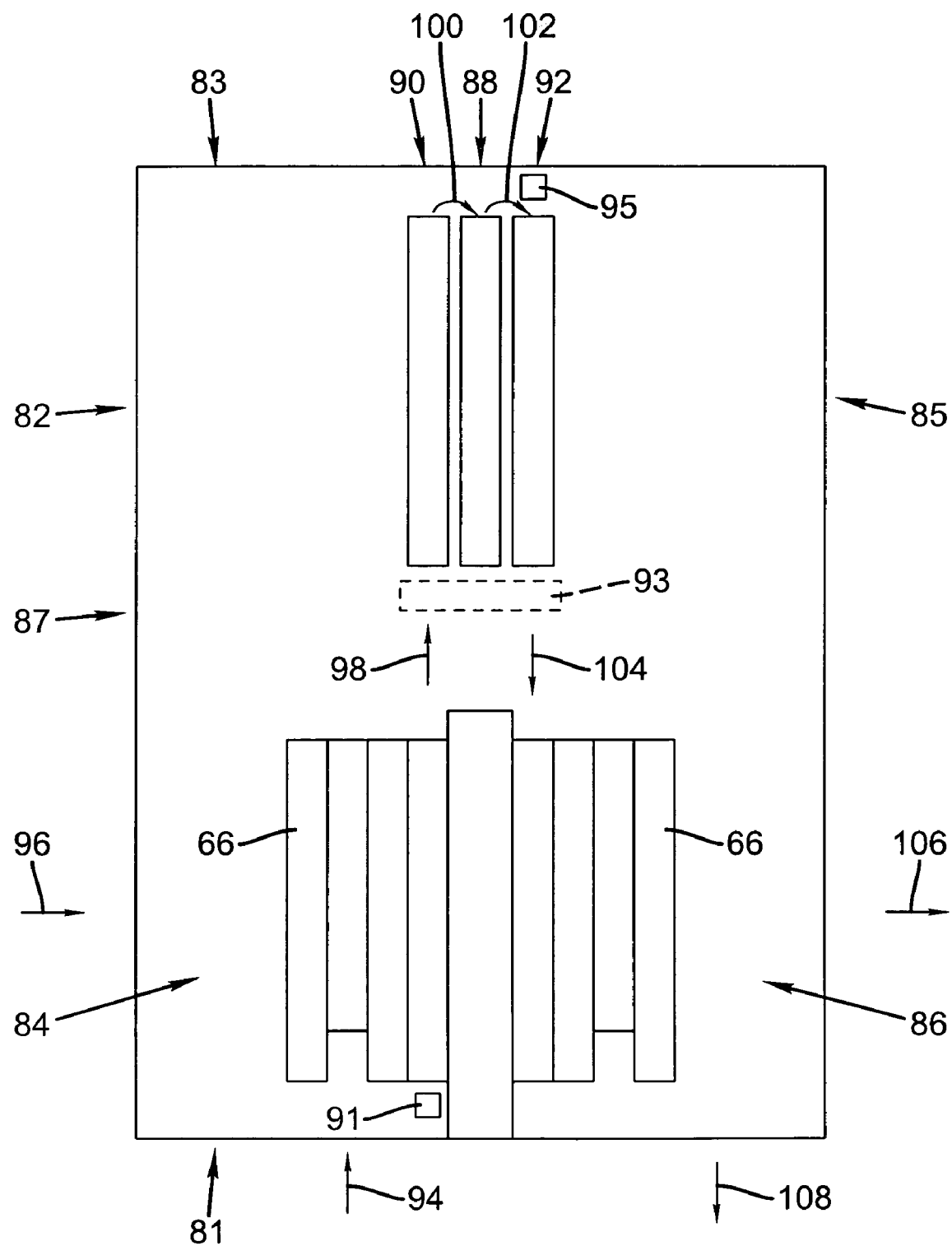

Referring now to FIGS. 32 and 33, there is shown another embodiment of the present invention. As shown, storage phosphor reader 80 includes multicassette autoloader 82 on the top of reader 80. Autoloader 82 includes front 81, back 83, and opposite sides 85, 87. At the front 81 of autoloader 82, there is provided in side by side spaced relationship an input bin 84, and an output bin 86. A display 89 is also provided. Storage phosphor cassettes 66 are loaded into input bin 84 in a stack of cassettes in face-to-face contact either from the front 81 or from the side 87. Cassettes 66 are oriented front-to-back with faces facing the sides of autoloader 82. Cassettes 66 can also be removed from output bin 86 from the front 81 or from the side 85. Autoloader 82 has a storage phosphor read location 88, with respective pre-read and post-read locations 90, 92 on either side of read location 88 at the back 83 of autoloader 82. As shown in FIG. 33, cassettes 66 are loaded as a stack in face-to-face contact into input bin 84 either from the front 81 (arrow 94) and/or from the side 87 (arrow 96). The innermost cassette 66 is transported by stripper 91 from input bin 84 to pre-read location 90 (arrow 98) by transport 93, from pre-read location 90 to storage phosphor read location 88 (arrow 100). After the read and erase cycle is completed at read location 88, the read and erased cassette 66 is transported by transport 93 to post-read location 92 (arrow 102), and finally by stripper 95 to output bin 86 (arrow 104). The cassettes 66 are then removed from output bin 86 either out the side 85 (arrow 106) or out the front 81 (arrow 108).

The embodiment shown in FIGS. 32 and 33 has a dimension from front 81 to back 83 which is more than twice the dimension of the largest cassette 66 processed by reader 80, since the cassette 66 is completely removed from input bin 84 before it is transported into read location 88. The embodiment shown in FIGS. 2 and 3 reduces this dimension considerably, thus providing a smaller footprint for the apparatus.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10—computed radiography system
12—X-ray source
14—object of interest (body part)
16—storage phosphor (SP)
18—storage phosphor reader
20—digital radiographic image
50—storage phosphor reader
51—front
52—housing
53—back
54—read module
55—side
56—erase module
57—side
58—multicassette autoloader
59—display
60—input bin
62—output bin
64—storage phosphor read location
66—storage phosphor cassette
67—output cassette transport assembly
68—clamp
69—input cassette transport assembly
70—clamp
72—storage phosphor transport assembly
74—storage phosphor
76—bidirectional arrow
80—storage phosphor reader
81—front
82—multicassette autoloader
83—back
84—input bin
85—side
86—output bin
87—side
88—storage phosphor read location
89—display
90—pre-read location
91—stripper
92—post-read location
93—transport
94—arrow
95—stripper
96, 98, 100, 102, 104, 106, 108—arrows
200—storage phosphor reader
201—front
202—multicassette autoloader
203—back
204—input bin
205—side
206—output bin 207—side
208—storage phosphor read location
210—pre-read location
212—post-read location
214, 216—fixed walls
218—input telescoping wall
220—output telescoping wall
222—fixed clamp
224—moving clamp
226, 228—stack separators
230—transport
232, 234—transport cups
236—loader
237—loader drive
238—unloader
240—stripper
242, 244—ejectors
246—size changer/light curtain
248—output stack lifter mechanism
250—bar code scanner
260, 262, 264, 266, 268, 270, 272, 274, 276, 278—arrows
300—inclined lower wall
302—ribs
304—inclined back wall
306—ribs
308, 310, 312—arrows
350—block
352—rail
354—motor
356—belt
360, 362, 364, 366—arrows
370, 372—arrows
400—carrier
402—arrow
404—linear drive
406—motor
408—belt
500, 502, 504—arrows
600—extraction bar and hook assembly
602, 604, 606, 608, 610, 612, 614, 616, 618, 620, 622, 624, 626, 628, 630—arrows

What is claimed is:

1. A multicassette autoloader for vertically oriented storage phosphor cassettes, said autoloader having a front, back, and opposite sides, comprising:
    an input bin for receiving multiple vertically oriented storage phosphor cassettes stacked together in face-to-face contact; wherein said cassettes are oriented front-to-back with faces facing said autoloader sides, wherein each of said cassettes contains a storage phosphor which is removable from said cassette;
    a storage phosphor read location at which a storage phosphor is removed from and replaced in a storage phosphor cassette positioned at said storage phosphor read location;
    a storage phosphor cassette pre-read location, and a storage phosphor cassette post-read location located on either side of said storage phosphor read location;
    an output bin for receiving storage phosphor cassettes for subsequent removal;
    wherein said input bin and said output bin are beside each other at the front of said autoloader, and said storage phosphor cassette pre-read location, said storage phosphor read location, and said storage phosphor cassette post-read location are beside each other at the back of said autoloader and in line front-to-back with said input bin and said output bin;
    an assembly for transporting a storage phosphor cassette along a path from said input bin, to said pre-read location, to said read location, to said post-read location, and then to said output bin,
    wherein said read location is positioned to the back of but overlapping said input and said output bins; and
    wherein said output bin has an output telescoping wall which is retracted when a read cassette is to be transported from said read location to said post-read location.

2. The autoloader of claim 1 wherein said read location is positioned to the back of but overlapping said input and said output bins.

3. The autoloader of claim 1 wherein said input bin includes an inclined bottom wall for assisting in feeding said cassettes through gravity.

4. The autoloader of claim 1 wherein said input bin is open on the side and front to allow loading of cassettes into said input bin from the side, diagonally or from the front.

5. The autoloader of claim 1 wherein said output bin is open on the side and front to allow removal of cassettes from the side, diagonally or from the front.

6. The autoloader of claim 1 wherein said input bin has a stack separator for separating a cassette from a stack of cassettes in said input bin in preparation for transporting said cassette from said input bin to said pre-read location.

7. The autoloader of claim 1 wherein said input bin has a stripper for transporting a cassette from said input bin to said pre-read location.

8. A multicassette autoloader for vertically oriented storage phosphor cassettes, said autoloader having a front, back, and opposite sides, comprising:
    an input bin for receiving multiple vertically oriented storage phosphor cassettes stacked together in face-to-face contact; wherein said cassettes are oriented front-to-back with faces facing said autoloader sides, wherein each of said cassettes contains a storage phosphor which is removable from said cassette;
    a storage phosphor read location at which a storage phosphor is removed from and replaced in a storage phosphor cassette positioned at said storage phosphor read location;
    a storage phosphor cassette pre-read location, and a storage phosphor cassette post-read location located on either side of said storage phosphor read location;
    an output bin for receiving storage phosphor cassettes for subsequent removal;
    wherein said input bin and said output bin are beside each other at the front of said autoloader, and said storage phosphor cassette pre-read location, said storage phosphor read location, and said storage phosphor cassette post-read location are beside each other at the back of said autoloader and in line front-to-back with said input bin and said output bin;
    an assembly for transporting a storage phosphor cassette along a path from said input bin, to said pre-read location, to said read location, to said post-read location, and then to said output bin,
    wherein said read location is positioned to the back of but overlapping said input and said output bins; and
    wherein said autoloader includes a cassette ejector for transporting a read cassette from said post-read location to said output bin and said output bin has an output stack separator and an output stack lifter mechanism for facilitating said transport.

* * * * *